United States Patent
Ciuperca

(10) Patent No.: US 10,065,339 B2
(45) Date of Patent: *Sep. 4, 2018

(54) REMOVABLE COMPOSITE INSULATED CONCRETE FORM, INSULATED PRECAST CONCRETE TABLE AND METHOD OF ACCELERATING CONCRETE CURING USING SAME

(71) Applicant: Romeo Ilarian Ciuperca, Norcross, GA (US)

(72) Inventor: Romeo Ilarian Ciuperca, Norcross, GA (US)

( * ) Notice: Subject to any disclaimer, the term of this patent is extended or adjusted under 35 U.S.C. 154(b) by 930 days.

This patent is subject to a terminal disclaimer.

(21) Appl. No.: 14/275,854

(22) Filed: May 12, 2014

(65) Prior Publication Data

US 2014/0333010 A1    Nov. 13, 2014

Related U.S. Application Data

(60) Provisional application No. 61/822,858, filed on May 13, 2013.

(51) Int. Cl.
*B28B 7/36* (2006.01)
*B28B 1/14* (2006.01)
(Continued)

(52) U.S. Cl.
CPC ............... *B28B 7/34* (2013.01); *C04B 26/04* (2013.01); *C04B 26/14* (2013.01); *C04B 28/02* (2013.01);
(Continued)

(58) Field of Classification Search
CPC .... B28B 1/14; B28B 7/34; B28B 7/36; E04G 9/10; E04G 11/08; E04G 11/10; E04G 9/05; E04G 2009/028; E04G 9/04
(Continued)

(56) References Cited

U.S. PATENT DOCUMENTS 1,343,572 A * 6/1920 Gascoigne ................ B28B 1/04
249/126
2,053,135 A    9/1936 Dalton
(Continued)

FOREIGN PATENT DOCUMENTS

EP    2065530 A2    6/2009

OTHER PUBLICATIONS

"Wollastonite—A Versatile Industrial Mineral", https://pubs.usgs.gov/fs/fs-0002-01/fs-0002-01textonly.pdf, 2 pages. (Year: 2018).*
(Continued)

*Primary Examiner* — Yogendra N Gupta
*Assistant Examiner* — Emmanuel S Luk
(74) *Attorney, Agent, or Firm* — Robert E. Richards; Richards IP Law

(57) ABSTRACT

The invention comprises a concrete form. The concrete form comprises a first panel having a first primary surface for contacting plastic concrete and a second primary surface opposite the first surface, wherein the first panel is made from a rigid plastic sheet or a metal sheet; and a second panel spaced from the second primary surface of the first panel, wherein the second panel is made from a rigid plastic sheet or a metal sheet. The concrete form also comprises a layer of insulating material disposed between the first panel and the second panel. A method of using the concrete form is also disclosed.

19 Claims, 7 Drawing Sheets

(51) Int. Cl.
  *B28B 7/34* (2006.01)
  *E04G 9/10* (2006.01)
  *C04B 26/04* (2006.01)
  *C04B 26/14* (2006.01)
  *C04B 28/02* (2006.01)
  *C04B 28/04* (2006.01)
  *C04B 28/08* (2006.01)
  *C04B 111/00* (2006.01)

(52) U.S. Cl.
  CPC ............. *C04B 28/04* (2013.01); *C04B 28/08* (2013.01); *E04G 9/10* (2013.01); *B28B 1/14* (2013.01); *B28B 7/36* (2013.01); *C04B 2111/00612* (2013.01); *C04B 2201/30* (2013.01); *Y02W 30/92* (2015.05); *Y02W 30/94* (2015.05); *Y02W 30/97* (2015.05)

(58) Field of Classification Search
  USPC .................................................. 249/1, 13, 78
  See application file for complete search history.

(56) References Cited

U.S. PATENT DOCUMENTS

| | | | |
|---|---|---|---|
| 3,185,432 A * | 5/1965 | Hager, Jr. | B29C 33/02 249/116 |
| 3,199,828 A | 8/1965 | Newton | |
| 3,420,981 A * | 1/1969 | Martinet | H05B 3/00 249/116 |
| 3,544,058 A * | 12/1970 | Lohman | B22D 7/08 164/323 |
| 3,596,351 A * | 8/1971 | Tilton | H05B 3/00 249/78 |
| 3,649,725 A | 3/1972 | Olson | |
| 3,708,148 A * | 1/1973 | Goransson | B28B 1/503 249/111 |
| 3,724,805 A * | 4/1973 | Kleiber | B28B 7/082 249/171 |
| 3,732,138 A | 5/1973 | Almog | |
| 3,985,329 A | 10/1976 | Liedgens | |
| 4,052,031 A | 10/1977 | Melfi | |
| 4,085,495 A | 4/1978 | Hebert | |
| 4,090,336 A | 5/1978 | Carroll | |
| 4,095,771 A * | 6/1978 | van der Lely | B28B 7/0044 249/112 |
| 4,157,638 A | 6/1979 | Della-Donna | |
| 4,349,398 A | 9/1982 | Kearns et al. | |
| 4,370,840 A | 2/1983 | Bisbee et al. | |
| 4,496,131 A * | 1/1985 | Yang | B29C 44/0407 249/78 |
| 4,516,372 A | 5/1985 | Grutsch | |
| 4,646,498 A | 3/1987 | Schneller et al. | |
| 4,659,056 A * | 4/1987 | Michaud-Soret | B29C 33/02 249/111 |
| 4,669,234 A | 6/1987 | Wilnau | |
| 4,744,849 A * | 5/1988 | Michaud-Soret | B29C 33/02 156/153 |
| 4,765,109 A | 8/1988 | Boeshart | |
| 4,811,927 A | 3/1989 | Slonimsky et al. | |
| 4,843,946 A * | 7/1989 | Gladstone | B29C 53/585 89/1.7 |
| 4,866,897 A | 9/1989 | Yount | |
| 4,885,888 A | 12/1989 | Young | |
| 4,889,310 A | 12/1989 | Boeshart | |
| 4,907,386 A | 3/1990 | Ekroth | |
| 5,107,648 A | 4/1992 | Roby | |
| 5,171,118 A | 12/1992 | Rothenbuhler | |
| 5,176,839 A * | 1/1993 | Kim | B29C 33/02 249/111 |
| 5,217,339 A | 6/1993 | O'Connor et al. | |
| 5,323,578 A | 6/1994 | Chagnon et al. | |
| D357,855 S | 5/1995 | Keith et al. | |
| 5,468,141 A * | 11/1995 | Iwami | B29C 33/3828 249/114.1 |
| 5,493,837 A | 2/1996 | Hepler | |
| 5,497,592 A | 3/1996 | Boeshart | |
| 5,570,550 A | 11/1996 | Roby | |
| 5,606,832 A | 3/1997 | Keith et al. | |
| 5,611,182 A | 3/1997 | Spude | |
| 5,761,874 A | 6/1998 | Hayakawa | |
| 5,765,318 A | 6/1998 | Michelsen | |
| 5,792,552 A | 8/1998 | Langkamp et al. | |
| 5,809,723 A | 9/1998 | Keith et al. | |
| 5,809,725 A | 9/1998 | Cretti | |
| 5,809,726 A | 9/1998 | Spude | |
| 5,809,728 A | 9/1998 | Tremelling | |
| 5,819,489 A | 10/1998 | McKinney | |
| 5,836,126 A | 11/1998 | Harkenrider et al. | |
| 5,966,885 A | 10/1999 | Chatelain | |
| 5,992,114 A | 11/1999 | Zelinsky et al. | |
| 6,026,620 A | 2/2000 | Spude | |
| 6,134,861 A | 10/2000 | Spude | |
| 6,138,981 A | 10/2000 | Keith et al. | |
| 6,234,736 B1 | 5/2001 | Miescher | |
| 6,263,638 B1 | 7/2001 | Long, Sr. | |
| 6,305,135 B1 | 10/2001 | Inaba | |
| 6,314,694 B1 | 11/2001 | Cooper et al. | |
| 6,360,505 B1 | 3/2002 | Johns | |
| 6,426,029 B1 | 7/2002 | Hiscock et al. | |
| 6,612,083 B1 | 9/2003 | Richards | |
| 6,651,444 B2 * | 11/2003 | Morimoto | B29C 44/5636 62/3.3 |
| 6,688,066 B1 | 2/2004 | Cottier et al. | |
| 6,725,616 B1 | 4/2004 | Pease | |
| 6,729,090 B2 | 5/2004 | Messenger et al. | |
| 6,898,908 B2 | 5/2005 | Messenger et al. | |
| 6,898,912 B2 | 5/2005 | Bravinski | |
| 6,935,081 B2 | 8/2005 | Dunn et al. | |
| 7,000,359 B2 | 2/2006 | Meyer | |
| 7,398,131 B2 | 7/2008 | Trost et al. | |
| 7,409,800 B2 | 8/2008 | Budge | |
| 7,765,761 B2 | 8/2010 | Paradis | |
| 7,818,935 B2 | 10/2010 | Velickovic | |
| 7,934,693 B2 | 5/2011 | Bravinski | |
| 8,032,244 B2 | 10/2011 | Trost et al. | |
| 8,532,815 B1 | 9/2013 | Ciuperca | |
| 8,545,749 B2 | 10/2013 | Ciuperca | |
| 8,555,583 B2 | 10/2013 | Ciuperca | |
| 8,555,584 B2 * | 10/2013 | Ciuperca | E04B 1/355 52/309.12 |
| 8,636,941 B1 | 1/2014 | Ciuperca | |
| 8,745,943 B2 * | 6/2014 | Ciuperca | E04B 1/355 52/309.12 |
| 8,756,890 B2 * | 6/2014 | Ciuperca | E04B 1/21 249/190 |
| 8,844,227 B1 * | 9/2014 | Ciuperca | E04C 2/296 52/309.11 |
| 8,877,329 B2 * | 11/2014 | Ciuperca | B32B 7/02 428/213 |
| 8,984,826 B2 * | 3/2015 | Ciuperca | E04B 1/355 52/309.12 |
| 9,003,740 B2 * | 4/2015 | Ciuperca | E04C 2/296 52/742.1 |
| 9,074,379 B2 * | 7/2015 | Ciuperca | E04G 9/10 |
| 9,115,503 B2 * | 8/2015 | Ciuperca | E04B 1/21 |
| 9,181,699 B2 * | 11/2015 | Ciuperca | E04B 1/355 |
| 9,624,679 B2 * | 4/2017 | Ciuperca | E04B 1/21 |
| 9,776,920 B2 * | 10/2017 | Ciuperca | C04B 28/04 |
| 9,862,118 B2 * | 1/2018 | Ciuperca | B28B 7/0032 |
| 2001/0057090 | 3/2001 | Spude et al. | |
| 2002/0005725 A1 | 1/2002 | Scott | |
| 2002/0092253 A1 | 7/2002 | Beliveau | |
| 2002/0148391 A1 * | 10/2002 | Wilde | C04B 28/02 106/638 |
| 2003/0192272 A1 | 10/2003 | Bravinski | |
| 2003/0224082 A1 * | 12/2003 | Akopyan | B29C 33/3828 425/174.4 |
| 2004/0058027 A1 * | 3/2004 | Guichard | B29C 33/04 425/174.6 |
| 2004/0070106 A1 * | 4/2004 | Harrington | B29C 33/3857 264/227 |
| 2004/0129857 A1 | 7/2004 | Musk et al. | |

(56) References Cited

U.S. PATENT DOCUMENTS

| | | |
|---|---|---|
| 2005/0108985 A1 | 5/2005 | Bravinski |
| 2007/0062143 A1 | 3/2007 | Noushad |
| 2007/0063378 A1* | 3/2007 | O'Donoghue ........ B29C 33/565 |
| | | 264/219 |
| 2007/0095255 A1 | 5/2007 | Abbate et al. |
| 2007/0144653 A1 | 6/2007 | Padilla et al. |
| 2008/0041004 A1 | 2/2008 | Gibbar et al. |
| 2008/0088056 A1* | 4/2008 | Vavra ...................... B28B 7/364 |
| | | 264/213 |
| 2008/0173788 A1 | 7/2008 | Brewka et al. |
| 2008/0313991 A1 | 12/2008 | Chouinard |
| 2009/0202307 A1 | 8/2009 | Au et al. |
| 2009/0218474 A1 | 9/2009 | Bowman |
| 2009/0277103 A1 | 11/2009 | De Jaham |
| 2010/0062667 A1 | 3/2010 | Pan et al. |
| 2010/0162659 A1 | 7/2010 | Laprise |
| 2010/0183761 A1* | 7/2010 | Iwami ................. B29C 33/3842 |
| | | 425/547 |
| 2010/0192498 A1 | 8/2010 | Gleckman |
| 2010/0221373 A1* | 9/2010 | Chen ....................... B29C 33/04 |
| | | 425/3 |
| 2010/0232877 A1 | 9/2010 | Sanvik et al. |
| 2010/0319295 A1 | 12/2010 | Nelson |
| 2011/0229595 A1* | 9/2011 | Krommer .......... B22D 17/2218 |
| | | 425/406 |
| 2011/0260351 A1* | 10/2011 | Corradi ............... B29C 44/3403 |
| | | 264/40.1 |
| 2012/0058299 A1 | 3/2012 | Serwin |
| 2014/0084132 A1 | 3/2014 | Ciuperca |
| 2014/0087158 A1 | 3/2014 | Ciuperca |
| 2014/0174647 A1 | 6/2014 | Ciuperca |
| 2014/0212643 A1* | 7/2014 | Ciuperca ................. E04B 1/355 |
| | | 428/210 |
| 2015/0069647 A1* | 3/2015 | Ciuperca ................... E04G 9/02 |
| | | 264/31 |
| 2015/0069664 A1* | 3/2015 | Ciuperca ............... B28B 7/0032 |
| | | 264/333 |

OTHER PUBLICATIONS

U.S. Appl. No. 14/229,566, filed Mar. 28, 2014.
U.S. Appl. No. 14/227,490, filed Mar. 27, 2014.
Preliminary Amendment filed on Mar. 27, 2014 in U.S. Appl. No. 14/227,490, filed Mar. 27, 2014.
U.S. Appl. No. 14/040,965, filed Sep. 30, 2013.
Office Action mailed Apr. 18, 2014 in U.S. Appl. No. 14/040,965, filed Sep. 30, 2013.
Response filed May 23, 2014 in U.S. Appl. No. 14/040,965, filed Sep. 30, 2013.
U.S. Appl. No. 13/626,087, filed Sep. 25, 2012.
Response filed May 7, 2014 in U.S. Appl. No. 13/626,087, filed Sep. 25, 2012.
Office Action mailed Mar. 3, 2014 in U.S. Appl. No. 13/626,087, filed Sep. 25, 2012.
Office Action mailed Mar. 27, 2014 in U.S. Appl. No. 13/834,574, filed Mar. 15, 2013.
Office Action mailed Jul. 3, 2014 in U.S. Appl. No. 13/834,574, filed Mar. 15, 2013.
Response filed Mar. 23, 2014 in U.S. Appl. No. 13/834,574, filed Mar. 15, 2013.
U.S. Appl. No. 13/834,574, filed Mar. 15, 2013.
U.S. Appl. No. 13/834,697, filed Mar. 15, 2013.
U.S. Appl. No. 14/214,815, filed Mar. 15, 2014.

* cited by examiner

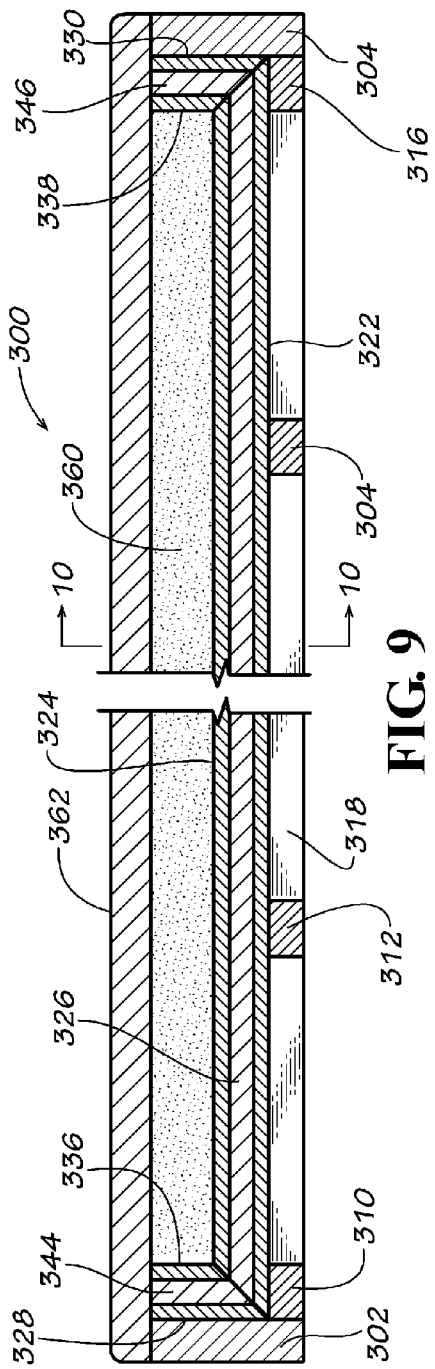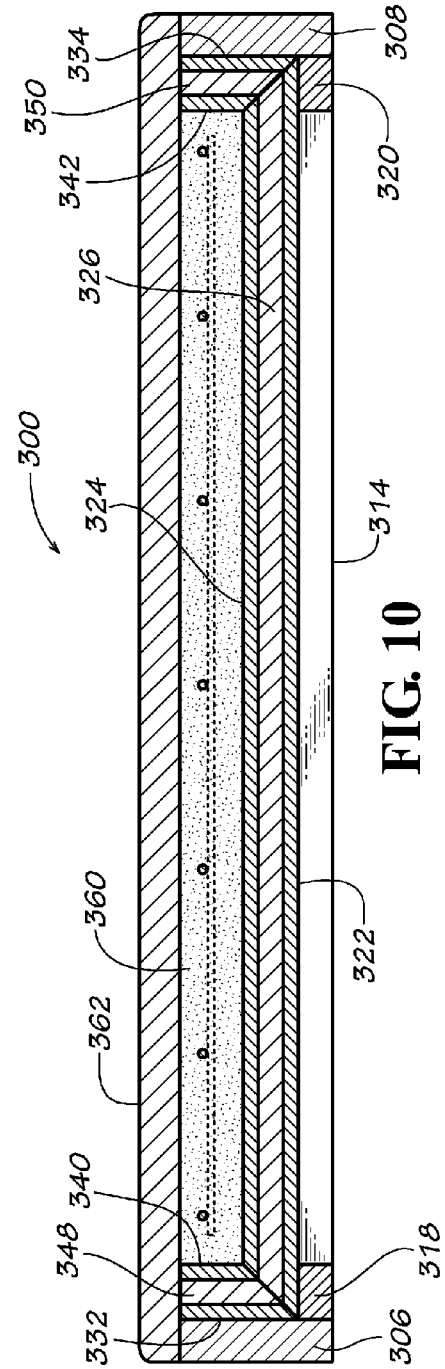

REMOVABLE COMPOSITE INSULATED CONCRETE FORM, INSULATED PRECAST CONCRETE TABLE AND METHOD OF ACCELERATING CONCRETE CURING USING SAME

CROSS-REFERENCE TO RELATED APPLICATIONS

The present application claims the benefit of the filing date of U.S. provisional patent application Ser. No. 61/822,858 filed May 13, 2013.

FIELD OF THE INVENTION

The present invention generally relates to a form for cement-based materials. More particularly, this invention relates to a concrete form, particularly an insulated concrete form. The present invention also relates to a method of curing concrete. The present invention also relates to a method for accelerating concrete curing using a removable insulated concrete form. The present invention also related to a method of curing concrete with reduced amounts of portland cement, which produces a concrete that cures faster and is stronger and more durable.

BACKGROUND OF THE INVENTION

Concrete is a composite material consisting of a mineral-based hydraulic binder which acts to adhere mineral particulates together in a solid mass; those particulates may consist of coarse aggregate (rock or gravel), fine aggregate (natural sand or crushed fines), and/or unhydrated or unreacted cement. Concrete typically is made from portland cement ("PC"), water and aggregate. Curing concrete requires two elements: suitable temperature and water. To achieve maximum strength, all cement particles must be hydrated. The initial process of hydration is exothermic; it generates a considerable amount of energy called "heat of hydration." Fluid (plastic) concrete is poured in various forms or molds and left to set until it has hardened sufficiently to remove the concrete forms. These prior art forms are not insulated and therefore concrete is exposed to the environment. Consequently, the energy generated from the heat of hydration is generally lost to the environment in the first 12-20 hrs. Generally, the concrete forms are removed exposing the concrete to the environment. In the next few days, most of the initial concrete moisture is also lost from the concrete. Therefore, the two elements required to fully hydrate the cement are lost during the initial stage of concrete curing. Thus, the cement may never fully hydrate, and, therefore, may never achieve maximum strength. Portland cement concrete achieves 90% of maximum strength under ideal curing conditions in about 28 days.

Portland cement manufacture causes environmental impacts at all stages of the process. During manufacture, a metric ton of $CO_2$ is released for every metric ton of portland cement made. Worldwide $CO_2$ emissions from portland cement manufacture amount to about 5-7% of total $CO_2$ emissions. The average energy input required to make one ton of portland cement is about 4.7 million Btu—the equivalent of about 418 pounds of coal. The production of portland cement is energy intensive, accounting for 2% of primary energy consumption globally. In 2010 the world production of hydraulic cement was 3,300 million tons.

Concrete can also be made with slag cement ("SC") and fly ash ("FA") but are not frequently used. Slag cement and fly ash generate relatively low amounts of heat of hydration, which result in extremely slow setting time and strength gain. Slag cement and fly ash can be mixed with portland cement but industry practice in building construction limits use of slag cement and fly ash to no more than 30% replacement of portland cement and only during warm weather conditions. Concrete made with slag cement and fly ash may take up to 90 days to achieve 80-90% of maximum strength. Mass concrete structures use more slag cement and fly ash, replacing up to 80% of portland cement, as a means to reduce the heat of hydration to reduce cracking. Slag cement and fly ash use less water to hydrate, may have finer particles than portland cement and produce concretes that achieve higher compressive and flexural strength. Such concrete is also less permeable, and, therefore, structures built with slag cement and fly ash have far longer service lives.

Slag cement is obtained by quenching molten iron slag (a by-product of iron and steel-making) from a blast furnace in water or steam, to produce a glassy, granular product that is then dried and ground into a fine powder. Slag cement manufacture uses only 15% of the energy needed to make portland cement. Since slag cement is made from a waste materials; no virgin materials are required and the amount of landfill space otherwise used for disposal is reduced. For each metric ton of pig iron produced, approximately ⅓ metric ton of slag is produced. In 2009, worldwide pig iron production was 1.211 billion tons. There was an estimated 400 million tons of slag produced that could potentially be made into slag cement. However, only a relatively small percentage of slag is used to make slag cement in the USA.

Fly ash is a by-product of the combustion of pulverized coal in electric power generation plants. When pulverized coal is ignited in a combustion chamber, the carbon and volatile materials are burned off. However, some of the mineral impurities of clay, shale, feldspars, etc. are fused in suspension and carried out of the combustion chamber in the exhaust gases. As the exhaust gases cool, the fused materials solidify into spherical glassy particles called fly ash. The quantity of fly ash produced is growing along with the steady global increase in coal use. According to Obada Kayali, a civil engineer at the University of New South Wales Australian Defense Force Academy, only 9% of the 600 million tons of fly ash produced worldwide in 2000 was recycled and even smaller amount used in concrete; most of the rest is disposed of in landfills. Since fly ash is a waste product, no additional energy is required to make it.

Historically, concrete has been made using natural cements and other pozzolanic materials, such as volcanic ash, certain type of reactive clays, rice husk ash, metakolin, silica fume and others. Pozzolanic materials have a very low rate of hydration and generate less heat of hydration. Therefore concrete made with pozzolanic materials are seldom used due to their slower curing process.

More recently pozzolanic materials, such a fly ash and volcanic ash have been modified through a process of fracturing which produces what is called "energetically modified cement." Such pozzolanic materials are typically of a generally spherical shape but can be fractured so that the round sphere particle is broken up into multiple particles with more surface area. The greater surface area creates a higher reactive particle, therefore increasing the hydration properties of the pozzolanic material.

Concrete walls, and other concrete structures and objects, traditionally are made by building a form or a mold. The forms and molds are usually made from wood, plywood, metal and other structural members. Unhardened (plastic)

concrete is poured into the space defined by opposed spaced form members. Once the concrete hardens sufficiently, although not completely, the forms are removed leaving a concrete wall or other concrete structure, structural member or concrete object exposed to ambient temperatures. Concrete forms are typically made of various types of plywood or metal supported by a frame. These forms are not insulated which means that concrete is exposed to the elements during the initial portion of the curing process. This often makes the curing of the concrete a slow process and the ultimate strength difficult to control or predict. To compensate for these losses and increase the rates of setting and strength development, larger amounts of portland cement are used than otherwise would be necessary.

The curing of plastic concrete requires two elements, water and heat, to fully hydrate the cementitious material. The curing of plastic concrete is an exothermic process. This heat is produced by the hydration of the portland cement, or other pozzolanic or cementitious materials, that make up the concrete. Initially, the hydration process produces a relatively large amount of heat. Concrete placed in conventional forms (i.e., uninsulated forms) loses this heat of hydration to the environment in a very short time, generally in the first 8-24 hours, depending on the ambient temperature. Also, due to the heat loss to the environment the concrete placed in conventional forms does not reach its maximum potential temperature. As the hydration process proceeds, relatively less heat of hydration is generated due to slowing reaction rates. At the same time, moisture in the concrete is lost to the environment. If one monitors the temperature of concrete during the curing process, it initially produces a relatively large increase in temperature which then decreases relatively rapidly over time. This chemical reaction is temperature dependent. That is, the hydration process, and consequently the strength gain, proceeds faster at higher temperature and slower at lower temperature. In conventional forms, both heat and moisture are lost in a relatively short time, which makes it difficult, or impossible, for the cementitious material to fully hydrate, and, therefore, the concrete may not achieve its maximum potential strength.

Concrete in conventional concrete forms or molds is typically exposed to the elements. Conventional forms or molds provide little or no insulation to the concrete contained therein. Therefore, heat produced within the concrete form or mold due to the hydration process usually is lost through a conventional concrete form or mold relatively quickly to the environment. Thus, the temperature of the plastic concrete may initially rise 20 to 40° C., or more, above ambient temperature due to the initial hydration process and then fall relatively quickly to ambient temperature, such as within 8 to 36 hours depending on the climate and season and size of the concrete element. This initial relatively large temperature drop may result in significant concrete shrinkage and/or thermal effects which can lead to concrete cracking. The remainder of the curing process is then conducted at approximately ambient temperatures, because the relatively small amount of additional heat produced by the remaining hydration process is relatively quickly lost through the uninsulated concrete form or mold. The concrete is therefore subjected to the hourly or daily fluctuations of ambient temperature from hour-to-hour, from day-to-night and from day-to-day. Failure to cure the concrete under ideal temperature and moisture conditions affects the ultimate strength and durability of the concrete. In addition the temperature gain and loss in the first few days of concrete curing creates thermal stresses within the concrete. At the time that the concrete reaches its maximum temperature, usually 8-16 hrs, the concrete is in a relatively weak state and cannot withstand the thermal stresses very well. The cooling of the concrete from the initial temperature peak creates temperature shrinkage cracking within the cement paste. The further heat loss and gain due to the ambient temperature fluctuations from day and night places additional thermal stresses upon the concrete and further contributes to temperature shrinkage cracking. While initially temperature shrinkage cracking is on a nano scale, with time, the nano cracks develops into fractures that weaken the concrete and shorten its lifespan.

In colder weather, concrete work may even come to a halt since concrete will freeze, or not gain much strength at all, at relatively low temperatures. By definition (ACI 306), cold weather conditions exist when " . . . for more than 3 consecutive days, the average daily temperature is less than 40 degrees Fahrenheit and the air temperature is not greater than 50 degrees Fahrenheit for more than one-half of any 24 hour period." Therefore, in order for hydration to take place, the temperature of concrete must be above 40° F.; below 40° F., the hydration process slows and at some point may stop altogether. Under conventional forming and curing methods, the concrete takes a relatively long time to fully hydrate the cementitious materials. Since both the initial heat and moisture are quickly lost in conventional forms, it is typically recommended that concrete by moisture cured for 28 days to fully hydrate the concrete. However, moisture curing for 28 days is seldom possible to administer in commercial practice. Therefore, concrete poured in various applications in conventional forms seldom develops it maximum potential strength and durability.

Insulated concrete form systems are known in the prior art and typically are made from a plurality of modular form members. U.S. Pat. Nos. 5,497,592; 5,809,725; 6,668,503; 6,898,912 and 7,124,547 (the disclosures of which are all incorporated herein by reference in their entirety) are exemplary of prior art modular insulated concrete form systems. Full-height insulated concrete forms are also known in the prior art. U.S. Patent Application Publication No. 2013/0074432 and U.S. Pat. No. 8,555,583 (the disclosures of which are both incorporated herein by reference in their entirety) disclose full-height insulated concrete forms. However, these insulated concrete forms are stay in place concrete forms whereby the insulating panels are attached to the concrete and are not easily removed. In addition if these insulated panels are removed from the concrete, they are usually damaged and not able to be reused.

Although insulated concrete forms work well and provide many benefits, concrete contractors and architects are somewhat reluctant to use them or specify them. Especially, stay in place insulated concrete forms cannot be used for applications that require removal of the formwork. Under conventional forming and curing methods, the concrete takes a relatively long time to fully hydrate the cementitious materials. Since both the initial heat and moisture is often relatively quickly lost, it is typically recommended that concrete be moist cured for 28 days to fully hydrate the cement. However, moisture curing for 28 days is seldom possible to achieve in commercial practice. Therefore, for concrete poured for various applications it can be very difficult, or impossible, to achieve its maximum potential strength and durability. Current insulated concrete forms are made of polymeric foam and remain in place after concrete is placed. However, there are many types of applications that do not need the insulation provided by insulated concrete forms to remain in place as part of the structure.

It is believed that prior art concrete forms have not been proposed or used as a method to cure concrete or to improve the performance and properties of concrete. The present invention has discovered that when retaining in an insulated concrete form the initial heat generated by the hydration of cementitious material, the concrete achieves a greater internal temperature and such temperature is sustained for much longer periods of time before it is lost to the environment. During this time, there is sufficient moisture in the concrete to hydrate the cementitious material. When the insulated concrete forms are removed, usually a few days after the pour, the concrete and cement paste would have already achieved a relatively high level a cement hydration with a relatively high corresponding compressive strength. A more fully hydrated cement paste and higher strength concrete is better able to withstand the stresses associated with temperature loss. Thus, the inevitable temperature shrinkage cracking associated with concrete forming is greatly reduced or eliminated.

Many concrete contractors prefer to use the prior art plywood-type form board and frame concrete form because it is the form with which they and the construction workforce are familiar. Therefore, it would be desirable to produce a concrete form that combines the benefits of an insulated concrete form with a removable conventional concrete form frame type that can retain the initial heat of hydration to accelerate the hydration and curing process and more fully cure concrete immediately after concrete is placed in the forms. It also would be desirable to reduce or eliminate temperature shrinkage cracking associated with conventional concrete forming. Any type of concrete placed in such forms will have far greater and improved properties and be more durable and longer lasting. It is also desirable to make concrete from as much post industrial waste as possible thereby reducing the burden on landfill. It would also be desirable to reduce the amount of portland cement used in concrete as much as possible to thereby reduce the amount of $CO_2$ emissions associated with manufacture of portland cement.

SUMMARY OF THE INVENTION

The present invention satisfies the foregoing needs by providing an improved concrete forming system to retain the heat of hydration of curing concrete.

In one disclosed embodiment, the present invention comprises a concrete form. The form comprises a first panel having a first primary surface for contacting plastic concrete and a second primary surface opposite the first surface and a layer of insulating material on the second primary surface.

In another disclosed embodiment, the present invention comprises a concrete form. The form comprises a first panel having a first primary surface for contacting plastic concrete and a second primary surface opposite the first primary surface, wherein the first panel is made from a rigid plastic sheet or a metal sheet. The concrete form also comprises a second panel spaced from the second primary surface of the first panel, wherein the second panel is made from a rigid plastic sheet or a metal sheet. The concrete form also comprises a layer of insulating material disposed between the first panel and the second panel.

In another disclosed embodiment, the present invention comprises a concrete form. The concrete form comprises a panel for contacting plastic concrete, the panel having a primary surface, wherein the panel is made from a rigid plastic sheet or a metal sheet and a layer of insulating material composed of ceramic fibers suspended in a polymeric foam or in an adhesive disposed on and substantially covering the primary surface.

In another disclosed embodiment, the present invention comprises a concrete form. The form comprises a panel for contacting plastic concrete, the panel having a primary surface, wherein the panel is made from a rigid plastic sheet or a metal sheet and a layer of refractory insulating material disposed on and covering the primary surface.

In another disclosed embodiment, the present invention comprises a method of forming concrete. The method comprises placing plastic concrete between a pair of opposed concrete forms. Each of the concrete forms comprises a first panel having a first primary surface for contacting plastic concrete and a second primary surface opposite the first primary surface, wherein the first panel is made from a rigid plastic sheet or a metal sheet. The concrete form also comprises a second panel spaced from the second primary surface of the first panel, wherein the second panel is made from a rigid plastic sheet or a metal sheet. The concrete form also comprises a layer of insulating material disposed between the first panel and the second panel. The method further comprises leaving the concrete forms in place for a time sufficient to at least partially cure the plastic concrete.

In another disclosed embodiment, the present invention comprises a method of forming concrete. The method comprises placing plastic concrete between a pair of opposed concrete forms. Each of the concrete forms comprises a panel for contacting plastic concrete, the panel having a primary surface, wherein the panel is made from a rigid plastic sheet or a metal sheet and a layer insulating material composed of ceramic fibers suspended in a polymeric foam or in an adhesive disposed on and substantially covering the primary surface. The method further comprises leaving the concrete forms in place for a time sufficient to at least partially cure the plastic concrete.

In another disclosed embodiment, the present invention comprises a method of forming concrete. The method comprises placing plastic concrete between a pair of opposed concrete forms. Each of the concrete forms comprises a panel for contacting plastic concrete, the panel having a primary surface, wherein the panel is made from a rigid plastic sheet or a metal sheet and a layer of refractory insulating material disposed on and covering the primary surface. The method further comprises leaving the concrete forms in place for a time sufficient to at least partially cure the plastic concrete.

Therefore, it is an object of the present invention to provide an improved insulated concrete form.

Another object of the present invention is to provide a removable insulated concrete form that can be used in the same manner as prior art frame plywood-type form board concrete forms.

A further object of the present invention is to provide a method of curing concrete by retaining the heat of hydration within the concrete thereby accelerating the hydration and curing of cementitious materials to achieve concrete with improved properties.

Another object of the present invention is to provide an improved method for curing concrete by more fully hydrating the cementitious material before needed heat and moisture are lost to the environment.

Another object of the present invention is to provide a system for curing concrete such that the concrete develops its maximum strength as early as possible.

Another object of the present invention is to provide a concrete forming system for curing concrete that reduces or eliminates temperature shrinkage cracking associated with conventional concrete forming.

A further object of the present invention is to provide a concrete curing system that uses reduced amounts of portland cement while producing concrete having an ultimate strength equivalent to concrete made with conventional amounts of portland cement.

Another object of the present invention is to provide a concrete curing system that substantially reduces the use of portland cement while producing concrete having an ultimate strength equivalent to concrete made with conventional amounts of portland cement.

A further object of the present invention is to provide a concrete curing system that uses relatively large amounts of recycled industrial waste material, such as slag cement, fly ash, volcanic ash, energetically modified cements, silica fume, pulverized glass and/or rice husk ash, while producing concrete having an ultimate strength equivalent to, or better than, concrete made with conventional amounts of portland cement.

A further object of the present invention is to provide a concrete curing system that uses inert or filler material, such as ground limestone, calcium carbonate, titanium dioxide, or quartz, while producing concrete having an ultimate strength equivalent to, or better than, concrete made with conventional amounts of portland cement.

A further object of the present invention is to provide a concrete curing system that uses relatively large amounts of recycled industrial waste material, such as slag cement, fly ash, volcanic ash, energetically modified cements, silica fume, pulverized glass and/or rice husk ash, in combination with inert or filler material, such as ground limestone, calcium carbonate, titanium dioxide, or quartz, while producing concrete having an ultimate strength equivalent to, or better than, concrete made with conventional amounts of portland cement.

Another object of the present invention is to provide a system for curing concrete such that concrete mixes containing reduced amounts of portland cement can be cured efficiently and effectively therein while having compressive strengths equivalent to, or better than, conventional concrete mixes.

Yet another object of the present invention is to provide a system for curing concrete such that the concrete develops its maximum durability.

Another object of the present invention is to provide a system for curing concrete more quickly.

Another object of the present invention is to provide an improved concrete form.

Another object of the present invention is to provide an insulated concrete form that provides insulation for both radiant heat loss and conductive heat loss.

These and other objects, features and advantages of the present invention will become apparent after a review of the following detailed description of the disclosed embodiments and the appended drawing and claims.

BRIEF DESCRIPTION OF THE DRAWINGS

FIG. 9 is a lateral cross-sectional view of another disclosed embodiment of an insulated precast casting table utilizing the form disclosed in FIGS. 5 and 6 in a horizontal configuration.

FIG. 10 is a cross-sectional view taken along the line 10-10 of the insulated precast casting table shown in FIG. 9.

DETAILED DESCRIPTION OF THE DISCLOSED EMBODIMENTS

Figure 1:
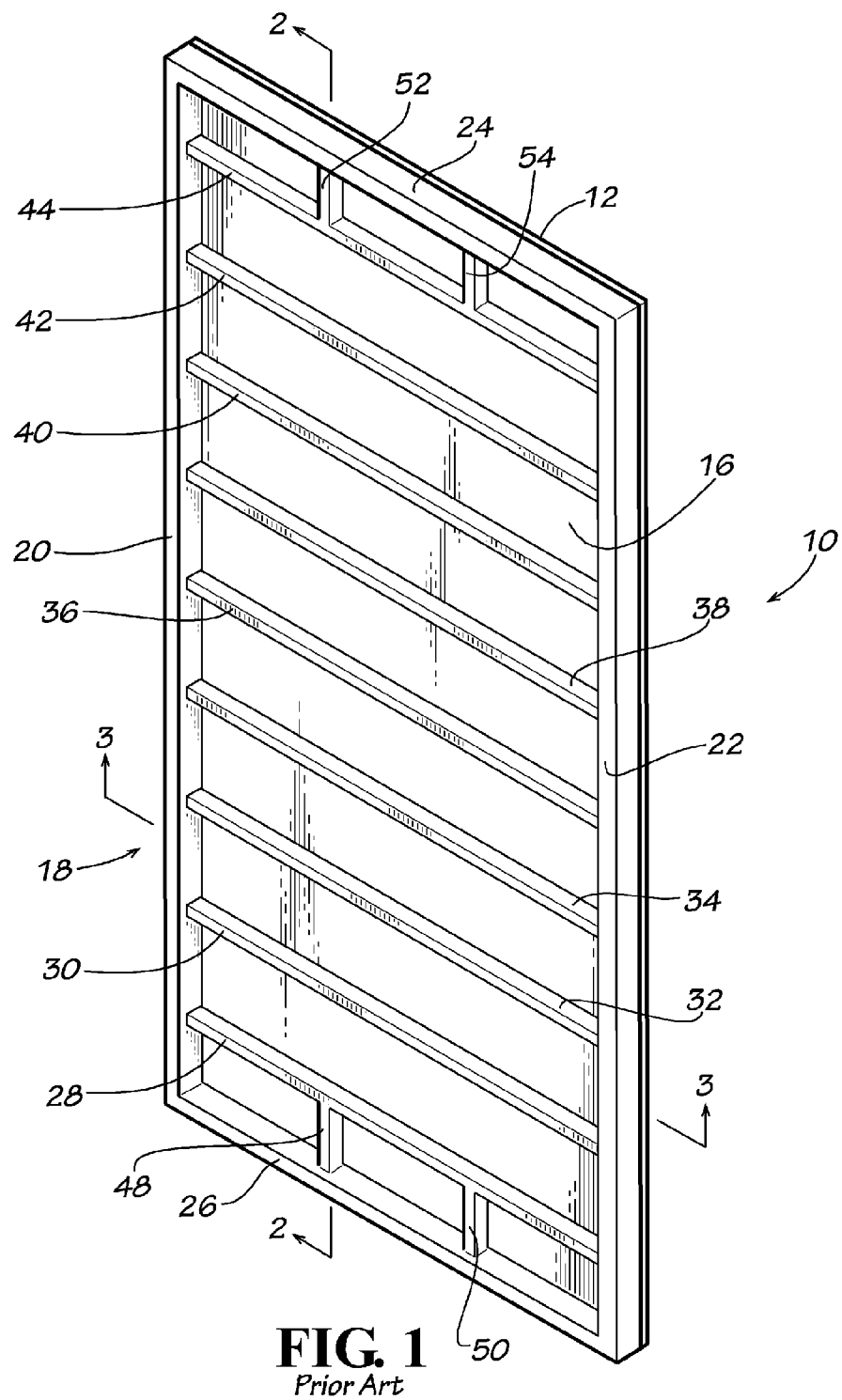
FIG. 1 is a partially broken away perspective view of a typical prior art concrete form having a plywood panel and steel frame construction.
Figure 2:
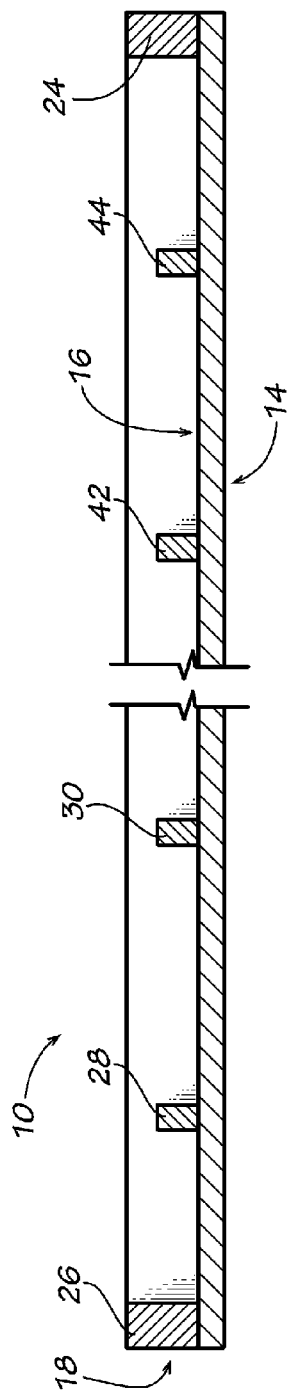
FIG. 2 is a partially broken away cross-sectional view taken along the line 2-2 of the prior art concrete form shown in FIG. 1.
Figure 3:
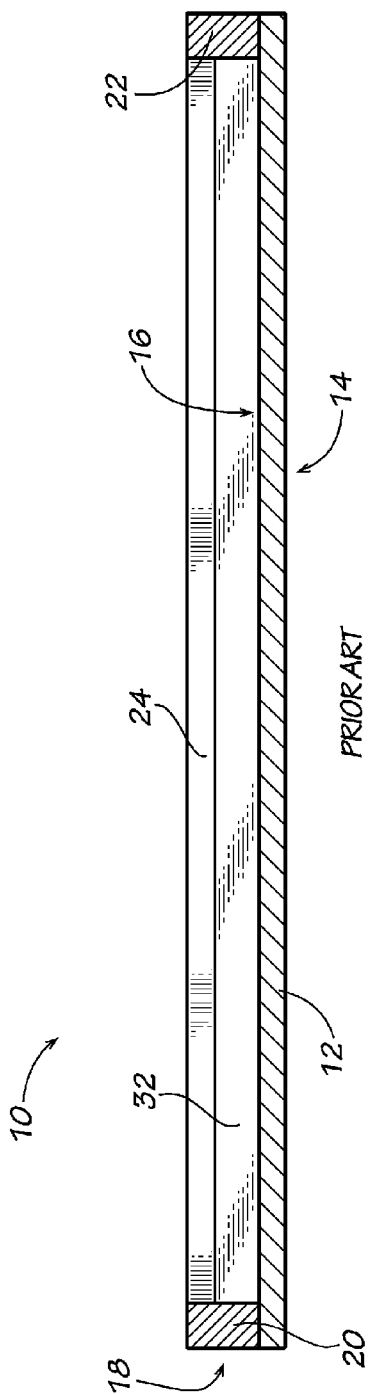
FIG. 3 is a cross-sectional view taken along the line 3-3 of the prior art concrete form shown in FIG. 1.

Referring now to the drawing in which like numbers indicate like elements throughout the several views, there is shown in FIG. 1 a typical prior art concrete form 10. The concrete form 10 comprises a rectangular concrete forming face panel 12 made of a wood material typically used in prior art concrete forms. Most prior art concrete forms use wood, plywood, wood composite materials, or wood or composite materials with polymer coatings for the concrete forming panel of their concrete forms. A preferred prior art material for the face panel 12 is a sheet of high density overlay (HDO) plywood. The prior art face panel 12 can be any useful thickness depending on the anticipated load the form will be subjected to. However, thicknesses of 0.5 inches to ⅞ inches are typically used. The panel 12 has a first primary surface 14 for contacting plastic concrete and an opposite second primary surface 16. The first surface 14 is usually smooth and flat. However, the first surface 14 can also be contoured so as to form a desired design in the concrete, such as a brick or stone pattern. The first surface 14 can also include a polymer coating to make the surface smoother, more durable and/or provide better release properties.

Attached to the second surface 16 of the panel 12 is a rectangular frame 18, which comprises two elongate longitudinal members 20, 22 and two elongate transverse members 24, 26. The longitudinal members 20, 22 and the transverse members 24, 26 are attached to each other and to the face panel 12 by any suitable means used in the prior art. The frame 18 also comprises at least one, and preferably a plurality, of transverse bracing members 28, 30, 32, 34, 36, 36, 40, 42, 44. The transverse bracing members 28-44 are attached to the longitudinal members 20, 22 and to the panel 12 by any suitable means used in the prior art. The frame 18 also includes bracing members 48, 50 and 52, 54. The bracing members 48, 50 extend between the transverse member 26 and the bracing member 28. The bracing members 48, 50 are attached to the transverse member 26 and the bracing member 28 and to the panel 12 by any suitable means used in the prior art. The bracing members 52, 54 extend between the transverse member 24 and the bracing member 44. The bracing members 52, 54 are attached to the transverse member 24 and to the bracing member 44 and to the panel 12 by any suitable means used in the prior art. The frame 18 helps prevent the panel 12 from flexing or deforming under the hydrostatic pressure of the plastic concrete when place between opposed forms. The frame 18 can be made from any suitable material, such as wood or metal, such as aluminum or steel, depending on the load to which the form will be subjected. The particular design of the frame 18 is not critical to the present invention. There are many different designs of frames for concrete forms and they are all applicable to the present invention.

Figure 4:
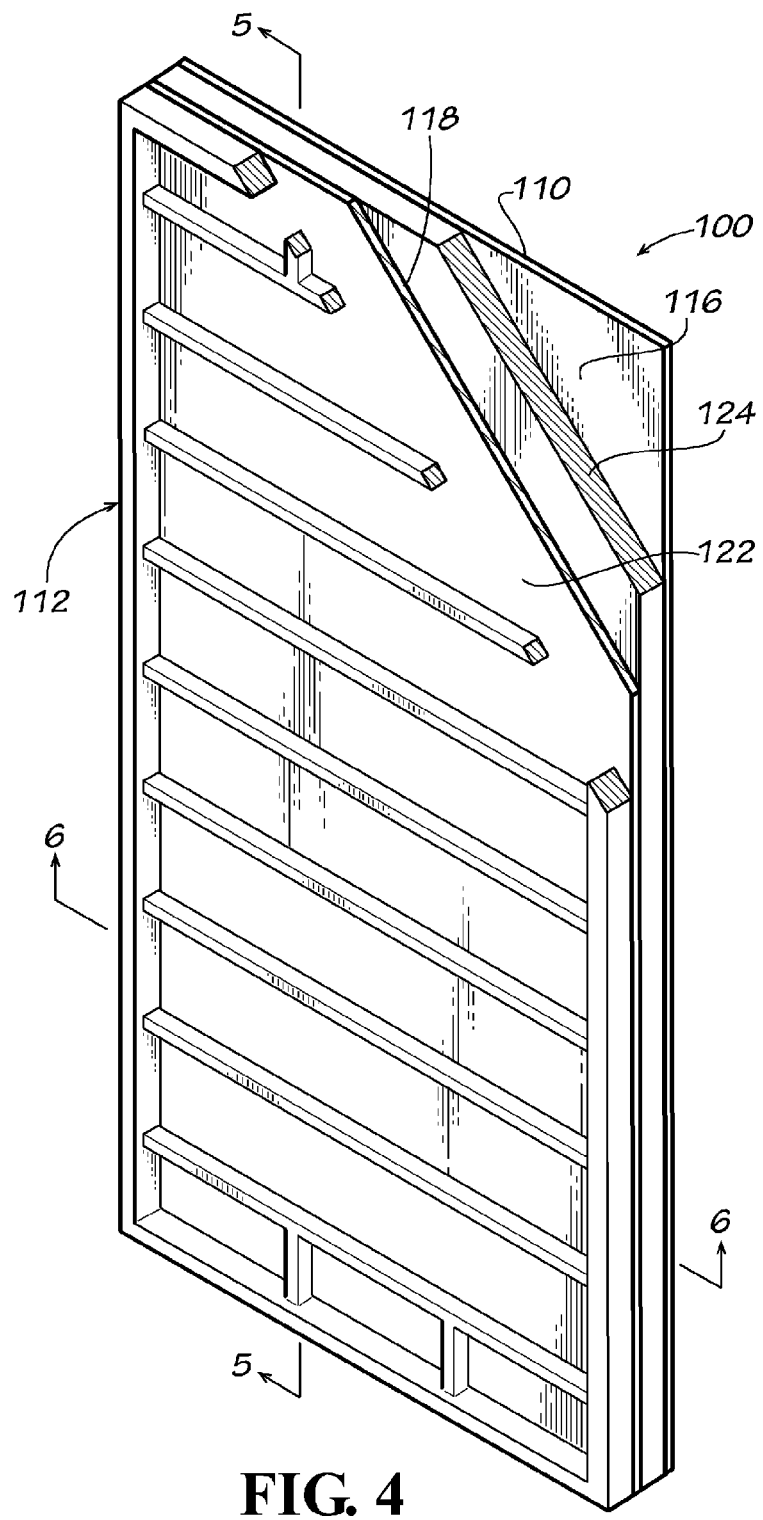
FIG. 4 is a partially broken away perspective view of a disclosed embodiment of an insulated concrete form in accordance with the present invention.
Figure 5:
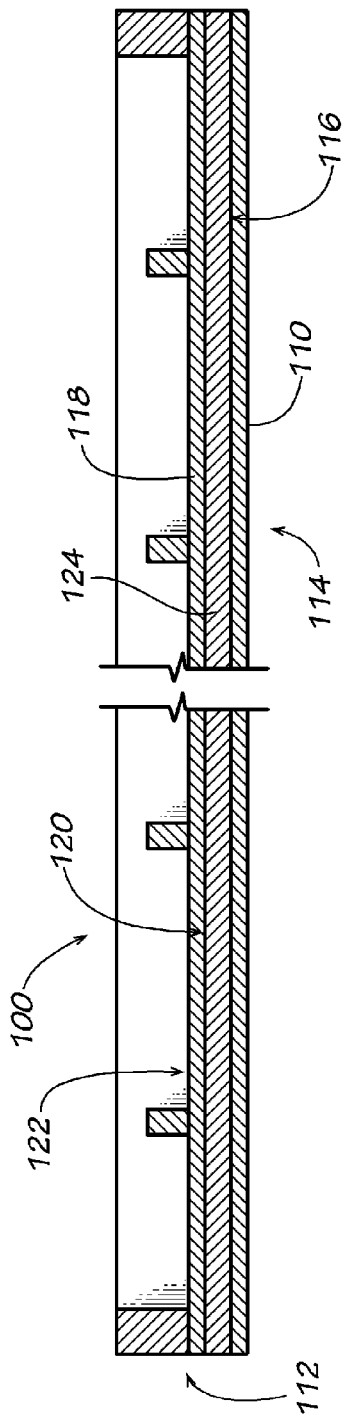
FIG. 5 is a partially broken away cross-sectional view taken along the line 5-5 of the insulated concrete form shown in FIG. 4.
Figure 6:
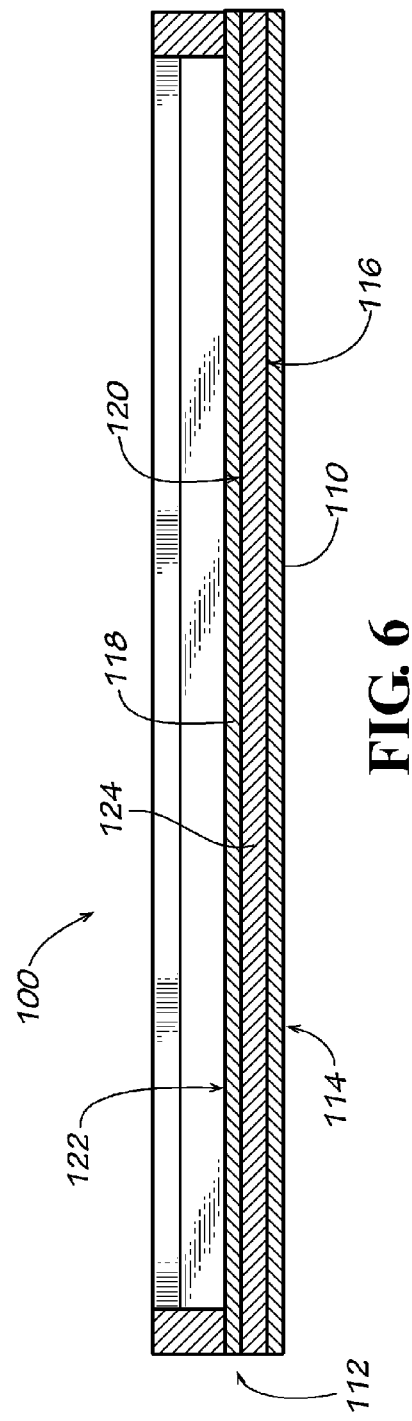
FIG. 6 is a cross-sectional view taken along the line 6-6 of the insulated concrete form shown in FIG. 4.

The present invention departs from conventional prior art plywood-type concrete forms, such as the form 10, as explained below. With reference to FIGS. 4-6 there is shown a composite insulated concrete form 100 in accordance with the present invention. The concrete form 100 comprises a face or first panel 110 and a frame 112. The first panel 110 and frame 112 can be identical to the prior art face panel 12 and frame 18, as described above, and therefore will not be described in any more detail here. The first panel 110 has a first primary surface 114 for contacting plastic concrete and an opposite second primary surface 116. The first panel 110 defines a plane. The insulated concrete form 100 also comprises a second panel 118 identical, or substantially identical, to the first panel 110. The second panel 118 has a first primary surface 120 and an opposite second primary surface 122. The first primary surface 120 of the second panel 118 is adjacent the second primary surface 116 of the first panel 110. Disposed between the first and second panels 110, 118 is a layer of insulating material 124. The layer of insulating material 124 covers, or substantially covers, the second primary surface 116 of the first panel 110 and the first primary surface 120 of the second panel 118. As used herein the term "substantially covers" means covering at least 80% of the surface area of the second primary surface 116 of the first panel 110.

For the insulated concrete form 100, the layer of insulating material 124 is made from any suitable material providing conductive heat insulating properties, preferably a sheet of closed cell polymeric foam. The layer of insulating material 124 is preferably made from closed cell foams of polyvinyl chloride, urethane, polyurethane, polyisocyanurate, phenol, polyethylene, polyimide or polystyrene. Such foam preferably has a density of 1 to 3 pounds per cubic foot, or more. The layer of insulating material 124 preferably has insulating properties equivalent to at least 0.25 inches of expanded polystyrene foam, equivalent to at least 0.5 inches of expanded polystyrene foam, preferably equivalent to at least 1 inch of expanded polystyrene foam, more preferably equivalent to at least 2 inches of expanded polystyrene foam, more preferably equivalent to at least 3 inches of expanded polystyrene foam, most preferably equivalent to at least 4 inches of expanded polystyrene foam. There is no maximum thickness for the equivalent expanded polystyrene foam useful in the present invention. The maximum thickness is usually dictated by economics, ease of handling and building or structure design. However, for most applications a maximum insulating equivalence of 8 inches of expanded polystyrene foam can be used. In another embodiment of the present invention, the layer of insulating material 202 has insulating properties equivalent to approximately 0.25 to approximately 8 inches of expanded polystyrene foam, preferably approximately 0.5 to approximately 8 inches of expanded polystyrene foam, preferably approximately 1 to approximately 8 inches of expanded polystyrene foam, preferably approximately 2 to approximately 8 inches of expanded polystyrene foam, more preferably approximately 3 to approximately 8 inches of expanded polystyrene foam, most preferably approximately 4 to approximately 8 inches of expanded polystyrene foam. These ranges for the equivalent insulating properties include all of the intermediate values. Thus, the layer of insulating material 124 used in another disclosed embodiment of the present invention has insulating properties equivalent to approximately 0.25 inches of expanded polystyrene foam, approximately 0.5 inches of expanded polystyrene foam, approximately 1 inch of expanded polystyrene foam, approximately 2 inches of expanded polystyrene foam, approximately 3 inches of expanded polystyrene foam, approximately 4 inches of expanded polystyrene foam, approximately 5 inches of expanded polystyrene foam, approximately 6 inches of expanded polystyrene foam, approximately 7 inches of expanded polystyrene foam, or approximately 8 inches of expanded polystyrene foam. Expanded polystyrene foam has an R-value of approximately 4 to 5 per inch thickness. Therefore, the layer of insulating material 124 should have an R-value of greater than 1.5, preferably greater than 4, more preferably greater than 8, especially greater than 12, most especially greater than 20. The layer of insulating material 124 preferably has an R-value of approximately 1.5 to approximately 40; more preferably between approximately 4 to approximately 40; especially approximately 8 to approximately 40; more especially approximately 12 to approximately 40. The layer of insulating material 124 preferably has an R-value of approximately 1.5, more preferably approximately 4, most preferably approximately 8, especially approximately 20, more especially approximately 30, most especially approximately 40.

The layer of insulating material 124 can also be made from a refractory insulating material, such as a refractory blanket, a refractory board or a refractory felt or paper. Refractory insulation is typically used to line high temperature furnaces or to insulate high temperature pipes. Refractory insulating material is typically made from ceramic fibers made from materials including, but not limited to, silica, silicon carbide, alumina, aluminum silicate, aluminum oxide, zirconia, calcium silicate; glass fibers, mineral wool fibers, Wollastonite and fireclay. Refractory insulating material is commercially available in various form including, but not limited to, bulk fiber, foam, blanket, board, felt and paper form. Refractory insulation is commercially available in blanket form as Fiberfrax Durablanket® insulation blanket from Unifrax I LLC, Niagara Falls, N.Y., USA and RSI4-Blank and RSI8-Blank from Refractory Specialties Incorporated, Sebring, Ohio, USA. Refractory insulation is commercially available in board form as Duraboard® from Unifrax I LLC, Niagara Falls, N.Y., USA and CS85, Marinite and Transite boards from BNZ Materials Inc., Littleton, Colo., USA. Refractory insulation in felt form is commercially available as Fibrax Felts and Fibrax Papers from Unifrax I LLC, Niagara Falls. The refractory insulating material can be any thickness that provides the desired insulating properties, as set forth above. There is no upper limit on the thickness of the refractory insulating material; this is usually dictated by economics. However, refractory insulating material useful in the present invention can range from $\frac{1}{32}$ inch to approximately 2 inches. Similarly, ceramic fiber materials including, but not limited to, silica, silicon carbide, alumina, aluminum silicate, aluminum oxide, zirconia, calcium silicate; glass fibers, mineral wool fibers, Wollastonite and fireclay, can be suspended in a polymer or polymeric foam, such as polyurethane, latex, cement or epoxy, and used as a coating or a polymeric foam to create a refractory insulating material layer, for example covering, or substantially covering, one of the primary surfaces 116, 120 of the first or second panels 110, 118, or both. Such a refractory insulating material layer can be used as the layer of insulating material 124 to block excessive ambient heat loads and retain the heat of hydration within the insulated concrete forms of the present invention. Ceramic fibers suspended in a polymer binder, such as latex or latex foam, are commercially available as Super Therm®, Epoxotherm and HPC Coating from Superior Products, II, Inc., Weston, Fla., USA. Fillers can also be added to the polymer or polymeric foam, such as fly ash, volcanic ash, crushed glass, glass spheres and the like.

The layer of insulating material 124 is preferably a multi-layer material with a first layer of refractory insulating material and a second layer of polymeric foam insulating material. The layer of insulating material 124 more preferably comprises a layer of refractory insulating felt or board and a layer of expanded polystyrene foam. The layer of insulating material 124 more preferably comprises a layer of refractory insulating material, such as a felt or board, and a layer of expanded polystyrene foam. Alternatively, the layer of insulating material 124 comprises a layer of expanded polystyrene, a layer of radiant heat reflective material, such as a metal foil, especially aluminum foil, and second layer of expanded polystyrene foam to form a sandwich with the radiant heat reflective material in the middle. In another disclosed embodiment, the layer of insulating material 124 comprises a layer of refractory material, a layer of radiant heat reflective material, such as a metal foil, especially aluminum foil, and a layer of expanded polystyrene foam to form a sandwich with the radiant heat reflective material in the middle. In still another disclosed embodiment, the layer of insulating material 124 comprises a layer of refractory material, a layer of radiant heat reflective material, such as a metal foil, especially aluminum foil, and a second layer of refractory material to form a sandwich with the radiant heat reflective material in the middle.

The first and second panels 116, 120 are preferably made from rigid sheets of plastic or metal. The first and second panels 116, 120 are preferably made from the same material. However, it is also contemplated that one of the first or second panels 116, 120 can be made from plastic and the other made from metal. Suitable metals include, but are not limited to, steel and aluminum. Suitable plastics include, but are not limited to, polyethylene (PE), poly(ethylene terephthalate) (PET), polypropylene (PP), polyvinyl chloride (PVC), chlorinated polyvinyl chloride (CPVC), acrylonitrile butadiene styrene (ABS), polycarbonate, polystyrene, nylon, urethane, polyurethane (PU), polyisocyanurate, phenol, polyimide, acrylic polymers such as polyacrylate, poly(methyl methacrylate) (PMMA), and the like. Alternatively, the first panel 116 can be made from rigid sheets of plastic or metal and the second panel 120 can be made from wood or plywood.

A particularly preferred plastic sheet for use as the first and/or second panels 116, 120 is corrugated plastic. Corrugated plastic sheet typically comprises two planar plastic sheet spaced from each other but connected to each other by a plurality of small I-beam formed plastic. The I-beam formed plastic connections between the planar sheets of plastic can be either perpendicular to the planar sheets of plastic or slanted. Corrugated plastic sheets can also be made by sandwiching a fluted sheet of plastic between two flat sheets of plastic (also called facings). The sheets can be joined together by gluing. The corrugated plastic sheet can be single wall corrugated sheets, double wall corrugated sheets or triple wall corrugated sheets. The insulating material 124 can then be applied to one or both of the corrugated sheet that form the first and second panels 116, 120 or the insulating material can be adhered to one or both of the corrugated sheets.

In another disclosed embodiment, if the corrugations of a corrugated plastic sheet are large enough; e.g., approximately 0.5 inches between the facings, the two facings of the corrugated sheet can be use as the first and second panels 116, 120. The insulating material 124 then preferably can be injected between the two facings and between the corrugations. In this case, the insulating material 124 is preferably foamed liquid plastic or a liquid plastic that blows in situ to form a foam. The foamed liquid plastic or a liquid plastic that blows in situ is then allowed to set and cure inside the corrugated plastic sheet.

In another disclosed embodiment a first plastic sheet can be laid on a work surface. A layer of plastic foam or a layer of liquid plastic that blows in situ can then be deposited on the first plastic sheet. A second plastic sheet can then be disposed on the layer of plastic foam or a layer of liquid plastic that blows in situ. Before the layer of plastic foam or a layer of liquid plastic that blows in situ, the first and second plastic sheets can be gauged to a desired thickness, such as by passing the first and second plastic sheets between a pair of spaced gauge rollers. After the first and second plastic sheets have been gauged to a desired thickness, the layer of plastic foam or a layer of liquid plastic that blows in situ is allowed to cure. If necessary, the sandwich of the first and second plastic sheets with the layer of plastic foam in between can be cut to a desired size and shape.

In another disclosed embodiment a first metal sheet can be laid on a work surface. A layer of plastic foam or a layer of liquid plastic that blows in situ can then be deposited on the first metal sheet. A second sheet of plastic or other composite insulating material can then be disposed on the layer of plastic foam or a layer of liquid plastic that blows in situ. Before the layer of plastic foam or a layer of liquid plastic that blows in situ sets up, the first and second sheets can be gauged to a desired thickness, such as by passing the first and second sheets between a pair of spaced gauge rollers. After the first and second sheets have been gauged to a desired thickness, the layer of plastic foam or a layer of liquid plastic that blows in situ is allowed to cure. If necessary, the sandwich of the first and second sheets with the layer of plastic foam in between can be cut to a desired size and shape. Any of the foregoing foams can have ceramic fibers suspended therein, so as to create a better conductive heat insulating and radiant heat reflective material.

Use of the insulated concrete form 100 will now be considered. The insulated concrete form 100 attached to either a wood or metal frame can be used in the same way as a conventional prior art plywood-type form, such as the concrete form 10. Two identical removable insulated concrete forms 100 are placed vertically and horizontally spaced from each other, in a manner well known in the art. Typically, multiple forms are attached to each other linearly to form, for example a wall of a desired length and configuration. Then, plastic concrete is placed in the spaced defined by the two opposed insulated concrete forms 100. The removable insulated concrete forms 100 are left in place for a time sufficient for the plastic concrete within the form to at least partially cure. While the insulated concrete forms 100 are in place, the layer of radiant heat reflective material 124 reduces the amount of heat of hydration lost from the curing concrete by reflecting at least some of the radiant heat therefrom back into the concrete. By retaining a portion of the heat of hydration, the plastic concrete in the insulated concrete form 100 cures more quickly and achieve better physical properties than it would have had it been cured in a conventional plywood-type concrete form, such as the concrete form 10. This is true for conventional portland cement concrete, but is even more so for concrete including slag cement and/or fly ash or other pozzolanic materials, as described below. Furthermore, it is desirable to leave the insulated concrete forms 100 in place with the curing concrete there between for a period of 1 to 28 days, preferably 1 to 14 days, more preferably 2 to 14 days, especially 5 to 14 days, more especially 1 to 7 days, most especially 1 to 3 days. After the concrete has cured to a desired degree, the insulated concrete forms 100 can be stripped from the concrete in a conventional manner known in the art. At this point, the concrete has relatively high strength and therefore can better withstand stresses associated with temperature changes.

The insulated concrete form 100 of the present invention is advantageous over the prior art because it can be used in the same manner as a prior art plywood-type frame concrete form. Therefore, there is no new training required to install or remove these forms. However, the insulated concrete form 100 produces cured concrete more quickly and concrete having improved physical properties without adding expensive chemical additives and without adding energy to the curing concrete. The insulated concrete form 100 also provides the option of reducing the amount of portland cement in the concrete mix, and, therefore, reducing the cost thereof and improving concrete performance.

Figure 7:
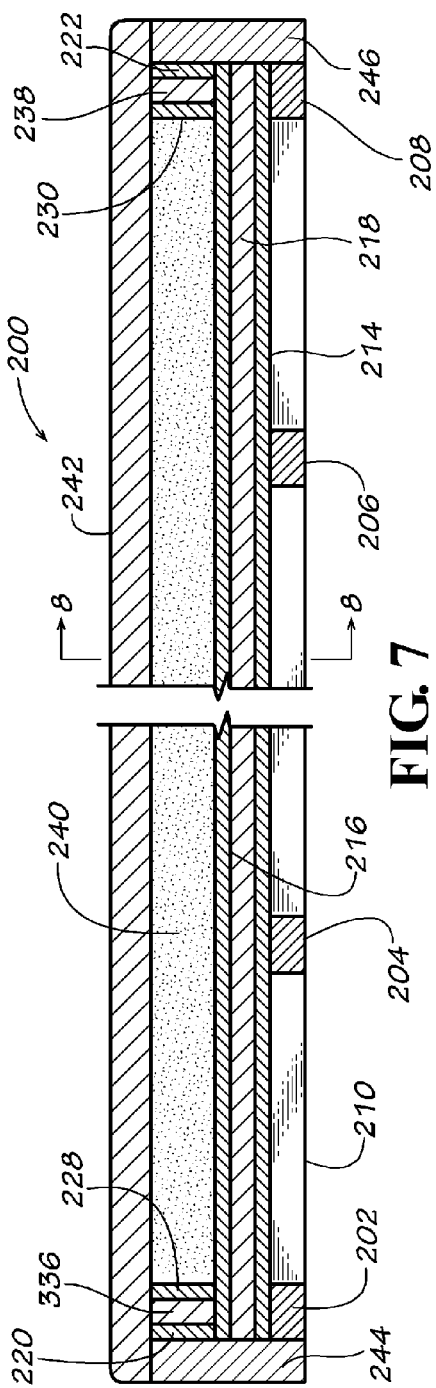
FIG. 7 is a lateral cross-sectional view of a disclosed embodiment of an insulated precast casting table utilizing the form disclosed in FIGS. 5 and 6 in a horizontal configuration.
Figure 8:
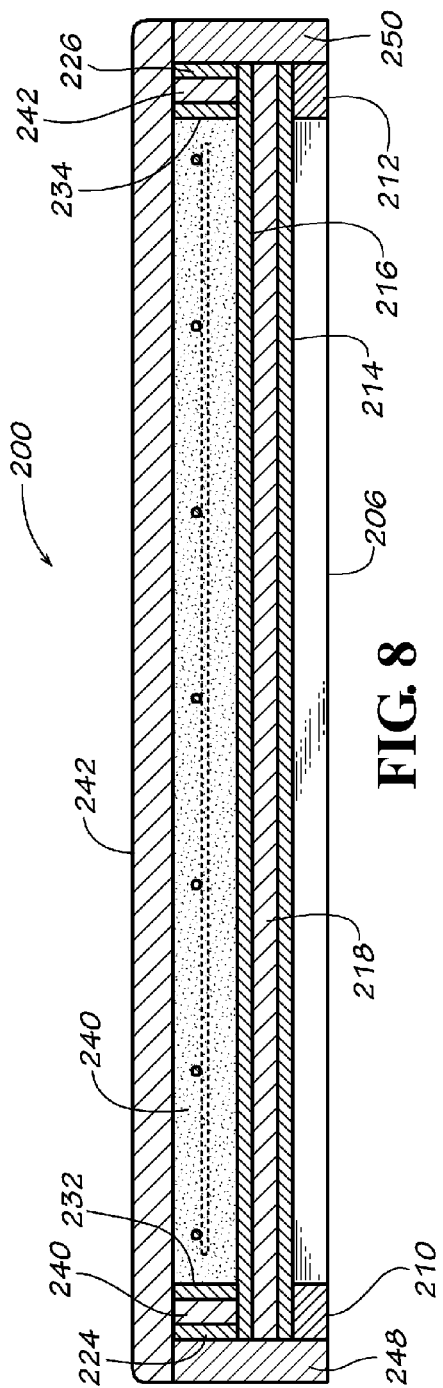
FIG. 8 is a cross-sectional view taken along the line 8-8 of the insulated precast casting table shown in FIG. 7.

FIGS. 7 and 8 show an alternate disclosed embodiment of the present invention in the form of an insulated precast concrete horizontal casting table 200. The horizontal casting table 200 comprises a rectangular frame including outer side members 244, 246, 248, 250. The outer side members 244, 246, 248, 250 are preferably made from an conductive heat insulating material or a material having relatively poor heat conducting properties, including, but not limited to, wood, plywood, wood composite materials, non-metal composite materials or insulating plastic. The horizontal casting table 200 further comprises a support frame including four horizontal transverse frame members 202, 204, 206, 208 preferably made from a strong material, such as steel or aluminum. The support frame also includes two horizontal longitudinal frame members 210, 212. The frame members 202, 204, 206, 208 are jointed to the frame members 210, 212 is a conventional manner. Attached to the frame members 202-212 is a horizontal first plate member 214. The first plate member 214 is made from a strong, rigid material including, but not limited to, wood, plastic, composite materials, steel and aluminum. Disposed above the first plate member 214 and spaced therefrom is an identical horizontal second plate member 216. Disposed between the first and second plate members 214, 216 is a layer of insulating material 218. The layer of insulating material covers, or substantially covers, the surface of the first and second plate members 214, 216. Disposed on the second plate member 216 at the peripheral edges thereof are first side members 220, 222, 224, 226. Disposed on the second plate members and spaced from the first side members 220-226 are second side members 228, 230, 232, 234. Disposed between the first side members 220-226 and the second side members 228-234 are layers of insulating material 236, 238, 240, 242. The layers of insulating material 236-242 cover, or substantially cover, the surface of the first side members 220-226, respectively, and the surface of the second side members 228-234, respectively.

For the insulated precast concrete horizontal casting table 200, the layers of insulating material 218, 236-242 are made from any suitable material providing conductive heat insulating properties, preferably sheets of closed cell polymeric foam. The layers of insulating material 218, 236-242 are preferably made from closed cell foams of polyvinyl chloride, urethane, polyurethane, polyisocyanurate, phenol, polyethylene, polyimide or polystyrene. Such foam preferably has a density of 1 to 3 pounds per cubic foot, or more. The layers of insulating material 218, 236-242 preferably have insulating properties equivalent to at least 0.25 inches of expanded polystyrene foam, equivalent to at least 0.5 inches of expanded polystyrene foam, preferably equivalent to at least 1 inch of expanded polystyrene foam, more preferably equivalent to at least 2 inches of expanded polystyrene foam, more preferably equivalent to at least 3 inches of expanded polystyrene foam, most preferably equivalent to at least 4 inches of expanded polystyrene foam. There is no maximum thickness for the equivalent expanded polystyrene foam useful in the present invention. The maximum thickness is usually dictated by economics, ease of handling and building or structure design. However, for most applications a maximum insulating equivalence of 8 inches of expanded polystyrene foam can be used. In another embodiment of the present invention, the layers of insulating material 218, 236-242 have insulating properties equivalent to approximately 0.25 to approximately 8 inches of expanded polystyrene foam, preferably approximately 0.5 to approximately 8 inches of expanded polystyrene foam, preferably approximately 1 to approximately 8 inches of expanded polystyrene foam, preferably approximately 2 to approximately 8 inches of expanded polystyrene foam, more preferably approximately 3 to approximately 8 inches of expanded polystyrene foam, most preferably approximately 4 to approximately 8 inches of expanded polystyrene foam. These ranges for the equivalent insulating properties include all of the intermediate values. Thus, the layers of insulating material 218, 236-242 used in another disclosed embodiment of the present invention have insulating properties equivalent to approximately 0.25 inches of expanded polystyrene foam, approximately 0.5 inches of expanded polystyrene foam, approximately 1 inch of expanded polystyrene foam, approximately 2 inches of expanded polystyrene foam, approximately 3 inches of expanded polystyrene foam, approximately 4 inches of expanded polystyrene foam, approximately 5 inches of expanded polystyrene foam, approximately 6 inches of expanded polystyrene foam, approximately 7 inches of expanded polystyrene foam, or approximately 8 inches of expanded polystyrene foam. Expanded polystyrene foam has an R-value of approximately 4 to 5 per inch thickness. Therefore, the layers of insulating material 218, 236-242 should have an R-value of greater than 1.5, preferably greater than 4, more preferably greater than 8, especially greater than 12, most especially greater than 20. The layer of insulating material 124 preferably has an R-value of approximately 1.5 to approximately 40; more preferably between approximately 4 to approximately 40; especially approximately 8 to approximately 40; more especially approximately 12 to approximately 40. The layers of insulating material 218, 236-242 preferably have an R-value of approximately 1.5, more preferably approximately 4, most preferably approximately 8, especially approximately 20, more especially approximately 30, most especially approximately 40.

The layers of insulating material 218, 236-242 can also be made from a refractory insulating material, such as a refractory blanket, a refractory board or a refractory felt or paper. Refractory insulation is typically used to line high temperature furnaces or to insulate high temperature pipes. Refractory insulating material is typically made from ceramic fibers made from materials including, but not limited to, silica, silicon carbide, alumina, aluminum silicate, aluminum oxide, zirconia, calcium silicate; glass fibers, mineral wool fibers, Wollastonite and fireclay. Refractory insulating material is commercially available in various form including, but not limited to, bulk fiber, foam, blanket, board, felt and paper form. Refractory insulation is commercially available in blanket form as Fiberfrax Durablanket® insulation blanket from Unifrax I LLC, Niagara Falls, N.Y., USA and RSI4-Blank and RSI8-Blank from Refractory Specialties Incorporated, Sebring, Ohio, USA. Refractory insulation is commercially available in board form as Duraboard® from Unifrax I LLC, Niagara Falls, N.Y., USA and CS85, Marinite and Transite boards from BNZ Materials Inc., Littleton, Colo., USA. Refractory insulation in felt form is commercially available as Fibrax Felts and Fibrax Papers from Unifrax I LLC, Niagara Falls. The refractory insulating material can be any thickness that provides the desired insulating properties, as set forth above. There is no upper limit on the thickness of the refractory insulating material; this is usually dictated by economics. However, refractory insulating material useful in the present invention can range from $\frac{1}{32}$ inch to approximately 2 inches. Similarly, ceramic fiber materials including, but not limited to, silica, silicon carbide, alumina, aluminum silicate, aluminum oxide, zirconia, calcium silicate; glass fibers, mineral wool fibers, Wollastonite and fireclay, can be suspended in a polymer or polymeric foam, such as polyurethane, latex, cement or epoxy, and used as a coating or a polymeric foam to create a refractory insulating material layer, for example covering, or substantially covering, one of the primary surfaces first plate member 214 or the second plate member 216, or both and covering, or substantially covering, a primary surface of the first side members 220-226 or the second side members 228-234 or both. Such a refractory insulating material layer can be used as the layers of insulating material 218, 236-242 to block excessive ambient heat loads and retain the heat of hydration within the insulated concrete forms of the present invention. Ceramic fibers suspended in a polymer binder, such as latex or latex foam, are commercially available as Super Therm®, Epoxotherm and HPC Coating from Superior Products, II, Inc., Weston, Fla., USA. Fillers can also be added to the polymer or polymeric foam, such as fly ash, volcanic ash, crushed glass, glass spheres and the like.

The layers of insulating material 218, 236-242 are preferably a multi-layer material with a first layer of refractory insulating material and a second layer of polymeric foam insulating material. The layers of insulating material 218, 236-242 more preferably comprise a layer of refractory insulating felt or board and a layer of expanded polystyrene foam. The layers of insulating material 218, 236-242 more preferably comprise a layer of refractory insulating material, such as a felt or board, and a layer of expanded polystyrene foam. Alternatively, the layers of insulating material 218, 236-242 comprise a layer of expanded polystyrene, a layer of radiant heat reflective material, such as a metal foil, especially aluminum foil, and second layer of expanded polystyrene foam to form a sandwich with the radiant heat reflective material in the middle. In another disclosed embodiment, the layers of insulating material 218, 236-242 comprise a layer of refractory material, a layer of radiant heat reflective material, such as a metal foil, especially aluminum foil, and a layer of expanded polystyrene foam to form a sandwich with the radiant heat reflective material in the middle. In still another disclosed embodiment, the layers of insulating material 218, 236-242 comprise a layer of refractory material, a layer of radiant heat reflective material, such as a metal foil, especially aluminum foil, and a second layer of refractory material to form a sandwich with the radiant heat reflective material in the middle.

Use of the insulated precast casting table 200 will now be considered. The second plate member 216 and the four second side members 228-234 define a mold or concrete receiving space for receiving plastic concrete. Plastic concrete 240 is placed on top of the second plate member 216 and until the concrete reaches a desired thickness. The second side members 228-234 define the sides of the mold and form the edges of the concrete 240. After the plastic concrete 240 is placed in the precast mold and the surface of the concrete is finished, as desired, a layer of insulating material 242 is placed on top of the first side members 220-226 and the second side members 228-234.

The layer of insulating material 242 is left on the insulated precast casting table 200 for a time sufficient for the concrete panels to achieve a desired amount or degree of cure. The amount of time for the concrete panels to reach a desired amount or degree of cure will vary based on a number of factors including the concrete mix design, the size of the concrete panels, the concrete panels temperature at the time of removal from the battery mold, ambient temperature conditions, the amount of insulation provided around the stacked concrete panels, the amount and kind of concrete curing additives used and the like. However, the concrete panels will usually achieve a sufficient amount or degree of cure within 1 to approximately 14 days, preferably 1 to approximately 10 days, more preferably 1 to approximately 7 days, most preferably 1 to approximately 5 days, especially 1 to approximately 3 days, more especially approximately 12 hours to approximately 3 days. After the concrete panels have achieved a desired amount or degree of cure, the layer of insulating material 242 is removed and the concrete panels are removed from the mold.

In an alternate disclosed embodiment, the layer of insulating material 242 is an electrically heated concrete curing blanket. When an electrically heated concrete curing blanket is used for the layer of insulating material 242, heat can be applied to the plastic concrete within the mold to accelerate the curing of the plastic concrete.

In another disclosed embodiment of the present invention, when an electrically heated concrete curing blanket is used for the layer of insulating material 242, it is desirable for the temperature of the concrete within the mold to be controlled so that the temperature of the concrete follows a predetermined temperature profile in the manner disclosed in applicant's U.S. Pat. No. 8,532,815 (the disclosure of which is incorporated herein by reference in its entirety). To do so, the electrically heat concrete curing blanket is controlled by a controller connected to a computing device that is also connected to one or more temperature sensors configured to sense the temperature of the concrete in the mold in the same manner as disclosed in applicant's U.S. Pat. No. 8,532,815 (the disclosure of which is incorporated herein by reference in its entirety).

FIGS. 9 and 10 show an alternate disclosed embodiment of the present invention in the form of an insulated precast concrete horizontal casting table 300. The horizontal casting table 300 comprises a rectangular frame including outer side members 302, 304, 306, 308. The horizontal casting table 300 further comprises a support frame including four horizontal transverse frame members 310, 312, 314, 316 preferably made from a strong material, such as steel or aluminum. The support frame also includes two horizontal longitudinal frame members 318, 320. The frame members 310-316 are jointed to the frame members 210, 212 in a conventional manner. Attached to the frame members 310-320 is a horizontal first plate member 322. The first plate member 322 is made from a strong, rigid material including, but not limited to, wood, plastic, composite materials, steel or aluminum. Disposed above the first plate member 322 and spaced therefrom is an identical horizontal second plate member 324. Disposed between the first and second plate members 322, 324 is a layer of insulating material 326. The layer of insulating material 326 covers, or substantially covers, the surface of the first and second plate members 322, 324. Disposed on the second plate member 324 at the peripheral edges thereof are first side members 328, 330, 332, 334. Joined to the second plate member 324 and spaced from the first side members 328-334 are second side members 336, 338, 340, 342. Disposed between the first side members 328-334 and the second side members 336-342 are layers of insulating material 344, 346, 348, 350. The layers of insulating material 344-350 cover, or substantially cover, the surface of the first side members 328-334, respectively, and the surface of the second side members 336-342, respectively. The layer of insulating material 326 and the layers of insulating material 344-350 for a continuous layer of insulation on the second plate 324 and second side members 336-342. This effectively thermally isolates the second plate 324 and second side members 336-342 from the environment and there is no thermal bridging of the second plate and second side members to other members in contact with the surrounding environment.

For the insulated precast concrete horizontal casting table 300, the layers of insulating material 324, 336-342 are made from any suitable material providing conductive heat insulating properties, preferably closed cell polymeric foam. The layers of insulating material 324, 336-342 are preferably made from closed cell foams of polyvinyl chloride, urethane, polyurethane, polyisocyanurate, phenol, polyethylene, polyimide or polystyrene. Such foam preferably has a density of 1 to 3 pounds per cubic foot, or more. The layers of insulating material 324, 336-342 preferably have insulating properties equivalent to at least 0.25 inches of expanded polystyrene foam, equivalent to at least 0.5 inches of expanded polystyrene foam, preferably equivalent to at least 1 inch of expanded polystyrene foam, more preferably equivalent to at least 2 inches of expanded polystyrene foam, more preferably equivalent to at least 3 inches of expanded polystyrene foam, most preferably equivalent to at least 4 inches of expanded polystyrene foam. There is no maximum thickness for the equivalent expanded polystyrene foam useful in the present invention. The maximum thickness is usually dictated by economics, ease of handling and building or structure design. However, for most applications a maximum insulating equivalence of 8 inches of expanded polystyrene foam can be used. In another embodiment of the present invention, the layers of insulating material 324, 336-342 have insulating properties equivalent to approximately 0.25 to approximately 8 inches of expanded polystyrene foam, preferably approximately 0.5 to approximately 8 inches of expanded polystyrene foam, preferably approximately 1 to approximately 8 inches of expanded polystyrene foam, preferably approximately 2 to approximately 8 inches of expanded polystyrene foam, more preferably approximately 3 to approximately 8 inches of expanded polystyrene foam, most preferably approximately 4 to approximately 8 inches of expanded polystyrene foam. These ranges for the equivalent insulating properties include all of the intermediate values. Thus, the layers of insulating material 324, 336-342 used in another disclosed embodiment of the present invention have insulating properties equivalent to approximately 0.25 inches of expanded polystyrene foam, approximately 0.5 inches of expanded polystyrene foam, approximately 1 inch of expanded polystyrene foam, approximately 2 inches of expanded polystyrene foam, approximately 3 inches of expanded polystyrene foam, approximately 4 inches of expanded polystyrene foam, approximately 5 inches of expanded polystyrene foam, approximately 6 inches of expanded polystyrene foam, approximately 7 inches of expanded polystyrene foam, or approximately 8 inches of expanded polystyrene foam. Expanded polystyrene foam has an R-value of approximately 4 to 5 per inch thickness. Therefore, the layers of insulating material 324, 336-342 should have an R-value of greater than 1.5, preferably greater than 4, more preferably greater than 8, especially greater than 12, most especially greater than 20. The layer of insulating material 124 preferably has an R-value of approximately 1.5 to approximately 40; more preferably between approximately 4 to approximately 40; especially approximately 8 to approximately 40; more especially approximately 12 to approximately 40. The layers of insulating material 324, 336-342 preferably have an R-value of approximately 1.5, more preferably approximately 4, most preferably approximately 8, especially approximately 20, more especially approximately 30, most especially approximately 40.

The layers of insulating material 324, 336-342 can also be made from a refractory insulating material, such as a refractory blanket, a refractory board or a refractory felt or paper. Refractory insulation is typically used to line high temperature furnaces or to insulate high temperature pipes. Refractory insulating material is typically made from ceramic fibers made from materials including, but not limited to, silica, silicon carbide, alumina, aluminum silicate, aluminum oxide, zirconia, calcium silicate; glass fibers, mineral wool fibers, Wollastonite and fireclay. Refractory insulating material is commercially available in various form including, but not limited to, bulk fiber, foam, blanket, board, felt and paper form. Refractory insulation is commercially available in blanket form as Fiberfrax Durablanket® insulation blanket from Unifrax I LLC, Niagara Falls, N.Y., USA and RSI4-Blank and RSI8-Blank from Refractory Specialties Incorporated, Sebring, Ohio, USA. Refractory insulation is commercially available in board form as Duraboard® from Unifrax I LLC, Niagara Falls, N.Y., USA and CS85, Marinite and Transite boards from BNZ Materials Inc., Littleton, Colo., USA. Refractory insulation in felt form is commercially available as Fibrax Felts and Fibrax Papers from Unifrax I LLC, Niagara Falls. The refractory insulating material can be any thickness that provides the desired insulating properties, as set forth above. There is no upper limit on the thickness of the refractory insulating material; this is usually dictated by economics. However, refractory insulating material useful in the present invention can range from 1/32 inch to approximately 2 inches. Similarly, ceramic fiber materials including, but not limited to, silica, silicon carbide, alumina, aluminum silicate, aluminum oxide, zirconia, calcium silicate; glass fibers, mineral wool fibers, Wollastonite and fireclay, can be suspended in a polymer or polymeric foam, such as polyurethane, latex, cement or epoxy, and used as a coating or a polymeric foam to create a refractory insulating material layer, for example covering, or substantially covering, one of the primary surfaces first plate member 322 or the second plate member 324, or both and covering, or substantially covering, a primary surface of the first side members 328-334 or the second side members 336-342 or both. Such a refractory insulating material layer can be used as the layers of insulating material 324, 336-342 to block excessive ambient heat loads and retain the heat of hydration within the insulated concrete forms of the present invention. Ceramic fibers suspended in a polymer binder, such as latex or latex foam, are commercially available as Super Therm®, Epoxotherm and HPC Coating from Superior Products, II, Inc., Weston, Fla., USA. Fillers can also be added to the polymer or polymeric foam, such as fly ash, volcanic ash, crushed glass, glass spheres and the like.

The layers of insulating material 324, 336-342 are preferably a multi-layer material with a first layer of refractory insulating material and a second layer of polymeric foam insulating material. The layers of insulating material 324, 336-342 more preferably comprise a layer of refractory insulating material, such as a felt or board, and a layer of expanded polystyrene foam. Alternatively, the layers of insulating material 324, 336-342 comprise a layer of expanded polystyrene, a layer of radiant heat reflective material, such as a metal foil, especially aluminum foil, and second layer of expanded polystyrene foam to form a sandwich with the radiant heat reflective material in the middle. In another disclosed embodiment, the layers of insulating material 324, 336-342 comprise a layer of refractory material, a layer of radiant heat reflective material, such as a metal foil, especially aluminum foil, and a layer of expanded polystyrene foam to form a sandwich with the radiant heat reflective material in the middle. In still another disclosed embodiment, the layers of insulating material 324, 336-342 comprise a layer of refractory material, a layer of radiant heat reflective material, such as a metal foil, especially aluminum foil, and a second layer of refractory material to form a sandwich with the radiant heat reflective material in the middle.

Use of the insulated precast casting table 300 will now be considered. The second plate member 324 and the four second side members 336-342 define a mold or concrete receiving space for receiving plastic concrete. Plastic concrete 360 is placed on top of the second plate member 324 and until the concrete reaches a desired thickness. The second side members 336-342 define the sides of the mold and form the edges of the concrete 360. After the plastic concrete 360 is placed in the precast mold and the surface of the concrete is finished, as desired, a layer of insulating material 362 is placed on top of the first side members 328-334 and the second side members 336-342.

The layer of insulating material 362 is left on the insulated precast casting table 300 for a time sufficient for the concrete panels to achieve a desired amount or degree of cure. The amount of time for the concrete panels to reach a desired amount or degree of cure will vary based on a number of factors including the concrete mix design, the size of the concrete panels, the concrete panels temperature at the time of removal from the battery mold, ambient temperature conditions, the amount of insulation provided around the stacked concrete panels, the amount and kind of concrete curing additives used and the like. However, the concrete panels will usually achieve a sufficient amount or degree of cure within 1 to approximately 14 days, preferably 1 to approximately 10 days, more preferably 1 to approximately 7 days, most preferably 1 to approximately 5 days, especially 1 to approximately 3 days, more especially approximately 12 hours to approximately 3 days. After the concrete panels have achieved a desired amount or degree of cure, the layer of insulating material 362 is removed and the concrete panels are removed from the mold.

In an alternate disclosed embodiment, the layer of insulating material 362 is an electrically heated concrete curing blanket. When an electrically heated concrete curing blanket is used for the layer of insulating material 362, heat can be applied to the plastic concrete within the mold to accelerate the curing of the plastic concrete.

In another disclosed embodiment of the present invention, when an electrically heated concrete curing blanket is used for the layer of insulating material 362, it is desirable for the temperature of the concrete within the mold to be controlled so that the temperature of the concrete follows a predetermined temperature profile in the manner disclosed in applicant's U.S. Pat. No. 8,532,815 (the disclosure of which is incorporated herein by reference in its entirety). To do so, the electrically heat concrete curing blanket is controlled by a controller connected to a computing device that is also connected to one or more temperature sensors configured to sense the temperature of the concrete 362 in the mold in the same manner as disclosed in applicant's U.S. Pat. No. 8,532,815 (the disclosure of which is incorporated herein by reference in its entirety).

Figure 11:
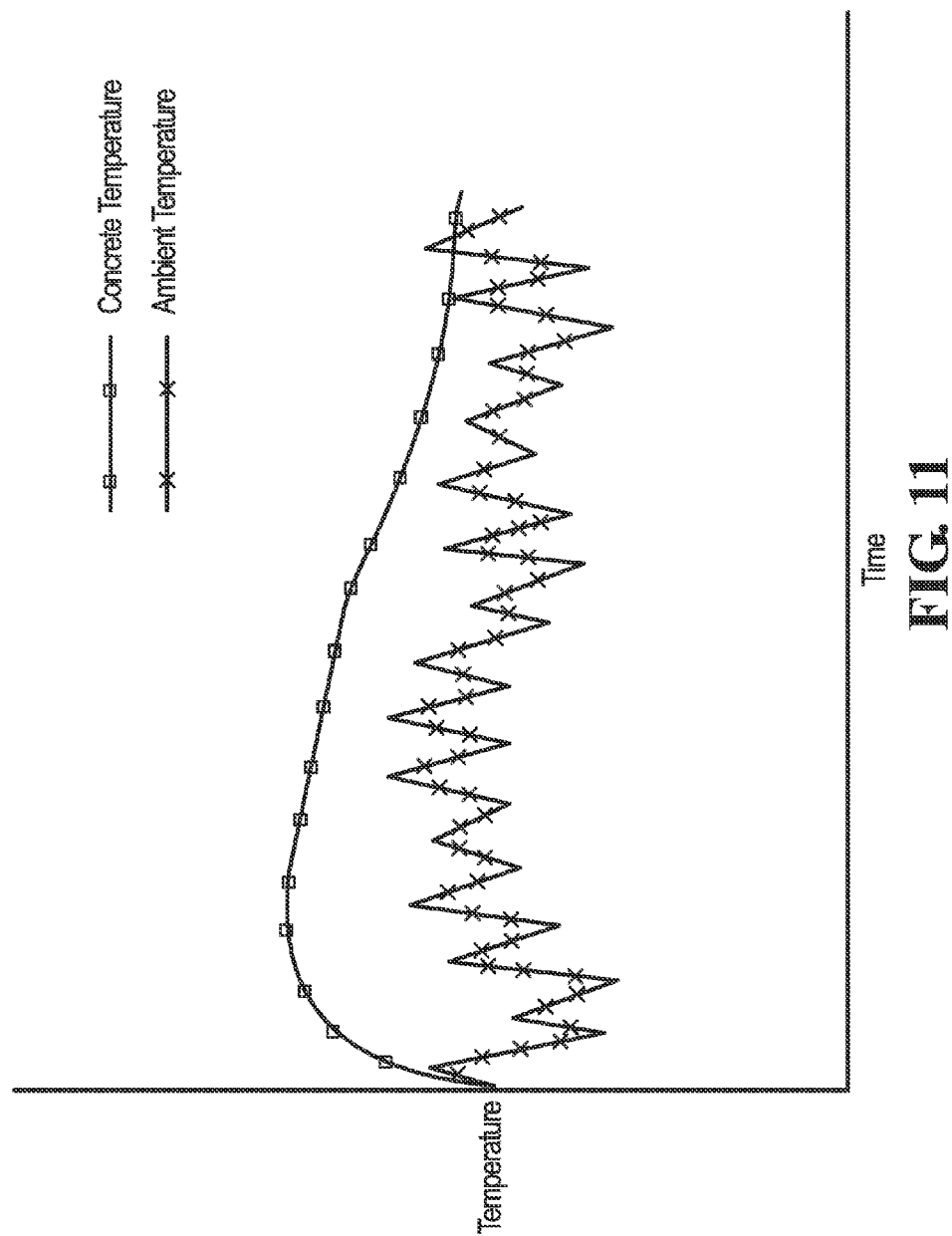
FIG. 11 is a graph of concrete temperature versus elapsed concrete curing time of a disclosed embodiment of a curing temperature profile for concrete in accordance with the present invention. An example of ambient temperature is also shown on the graph.

FIG. 11 shows a graph of a disclosed embodiment of a desired curing temperature profile for concrete as a function of time in accordance with the present invention. In this graph, the temperature of the concrete is shown on the vertical axis and elapsed concrete curing time is shown on the horizontal axis. The intersection of the vertical and horizontal axes represents 0° C. concrete temperature and zero elapsed concrete curing time. Ambient temperature is also shown on this graph. The peaks and troughs of the ambient temperature represent the daily (i.e., day to night) fluctuation of ambient temperature. As can be seen in this graph, the temperature of the concrete initially increases quite rapidly over a relatively short time, such as 1 to 3 days. After a period of time, the concrete temperature reaches a maximum and then slowly drops to ambient temperature over an extended period, such as 1 to 7 days, preferably 1 to 14 days, more preferably 1 to 28 days, especially 3 to 5 days or more especially 5 to 7 days. The maximum temperature will vary depending on the composition of the concrete mix. However, it is desirable that the maximum temperature is at least 35° C., preferably, at least 40° C., at least 45° C., at least 50° C., at least 55° C., at least 60° C. or at least 65° C. The maximum concrete temperature should not exceed about 70° C. The maximum concrete temperature is preferably about 70° C., about 69° C., about 68° C., about 67° C., about 66° C., about 65° C., about 64° C., about 63° C., about 62° C., about 61° C. about 60° C. or about 60 to about 70° C. Furthermore, it is desirable that the temperature of the concrete is maintained above approximately 30° C., approximately 35° C., approximately 40° C., approximately 45° C., approximately 50° C., approximately 55° C. or approximately 60° C. for 1 to approximately 4 days from the time of concrete placement, preferably 1 to approximately 3 days from the time of concrete placement, more preferably about 24 to about 48 hours from the time of concrete placement. It is also desirable that the temperature of the concrete is maintained above approximately 30° C. for 1 to approximately 7 days from the time of concrete placement, preferably above approximately 35° C. for 1 to approximately 7 days from the time of concrete placement, more preferably above approximately 40° C. for 1 to approximately 7 days from the time of concrete placement, most preferably above approximately 45° C. for 1 to approximately 7 days from the time of concrete placement. It is also desirable that the temperature of the concrete be maintained above ambient temperature for 1 to approximately 3 days from the time of concrete placement; 1 to approximately 5 days from the time of concrete placement, for 1 to approximately 7 days from the time of concrete placement, for 1 to approximately 14 days from the time of concrete placement, preferably approximately 3 to approximately 14 days from the time of concrete placement, especially approximately 7 to approximately 14 days from the time of concrete placement. It is also desirable that the temperature of the concrete be maintained above ambient temperature for approximately 3 days, approximately 5 days, approximately 7 days or approximately 14 days from the time of concrete placement. It is further desirable that the temperature of the concrete be reduced from the maximum temperature to ambient temperature gradually, such as in increments of approximately 0.5 to approximately 5° C. per day, preferably approximately 1 to approximately 2° C. per day, especially approximately 1° C. per day. The electrically heated blanket is preferably kept on the curing concrete until the concrete is strong enough such that cracking due to temperature shrinkage will not occur from further cooling. Different curing temperature profiles may apply to different concrete mix designs and/or different materials used for the cementitious portion of the concrete mix in order to achieve a desired concrete strength or a desired concrete strength within a desired period of time in different weather conditions. However, all curing temperature profiles in accordance with the present invention will have the same general shape as shown in FIG. 11 relative to ambient temperature. Thus, as used herein the term "temperature profile" includes retaining the heat generated by the cement hydration reaction so as to increase the concrete temperature above ambient temperature over a period of time followed by decreasing the concrete temperature over a period of time due to the gradual loss of heat to the environment, preferably to ambient temperature, wherein the slope of a line plotting temperature versus time during the temperature increase phase is greater than the absolute value of the slope of a line plotting temperature versus time during the temperature decrease phase. Furthermore, the absolute value of the slope of a line plotting temperature versus time during the temperature decrease phase of the temperature profile in a concrete form in accordance with the present invention is less than the absolute value of the slope of a line plotting temperature versus time if all added heat were stopped and the concrete were simply allowed to cool in a conventional concrete form; i.e., an uninsulated concrete form, or in direct contact with the environment under the same conditions. The term "temperature profile" includes the specific ranges of temperature increase and ranges of temperature decrease over ranges of time as set forth above with respect to FIG. 11. The term "temperature profile" includes increasing the temperature of curing concrete in a concrete form or mold to a maximum temperature at least 10% greater than the maximum temperature the same concrete mix would have reached in a conventional (i.e., non-insulated) concrete form or mold of the same configuration. The term "temperature profile" also includes reducing the temperature of curing concrete in a concrete form or mold from its maximum temperature at a rate slower than the rate the same concrete mix would reduce from its maximum temperature in a conventional (i.e., non-insulated) concrete form or mold of the same configuration. The principle behind concrete maturity is the relationship between strength, time, and temperature in young concrete. Maturity is a powerful and accurate means to predict early strength gain. Concrete maturity is measured as "equivalent age" and is given in temperature degrees x hours (either ° C.-Hrs or ° F.-Hrs). The term "temperature profile" includes controlling the temperature of curing concrete so that at 3 days it has a concrete maturity or equivalent age at least 25% greater than the same concrete mix would have in a conventional (i.e., non-insulated) concrete form or mold of the same configuration under the same conditions; preferably at least 30% greater, more preferably at least 35% greater, most preferably at least 40% greater, especially at least 45% greater, more especially at least 50% greater. The term "temperature profile" includes controlling the temperature of curing concrete so that at 3 days it has a concrete maturity or equivalent age about 70% greater than the same concrete mix would have when cured in accordance with ASTM C-39; preferably at least 75% greater, more preferably at least 80% greater, most preferably at least 85% greater, especially at least 90% greater, more especially at least 95% greater, most especially at least 100% greater. The term "temperature profile" includes controlling the temperature of curing concrete so that at 7 days it has a concrete maturity or equivalent age about 70% greater than the same concrete mix would have when cured in accordance with ASTM C-39; preferably at least 75% greater, more preferably at least 80% greater, most preferably at least 85% greater, especially at least 90% greater, more especially at least 95% greater, most especially at least 100% greater. The term "temperature profile" specifically does not include adding a constant amount of heat to the concrete followed by stopping adding heat to the concrete, such as would be involved when turning an electrically heated blanket or heated concrete form on and then turning the heated blanket or heated concrete form off. The term "temperature profile" specifically does not include heating the concrete to a desired temperature and then turning off the heat.

While the present invention can be used with conventional concrete mixes; i.e., concrete in which portland cement is the only cementitious material used in the concrete, it is preferred as a part of the present invention to use the concrete or mortar mixes disclosed in applicant's U.S. Pat. No. 8,545,749 (the disclosure of which is incorporated herein by reference in its entirety). Specifically, the concrete mix in accordance with the present invention comprises cementitious material, aggregate and water sufficient to hydrate the cementitious material. The amount of cementitious material used relative to the total weight of the concrete varies depending on the application and/or the strength of the concrete desired. Generally speaking, however, the cementitious material comprises approximately 25% to approximately 40% by weight of the total weight of the concrete, exclusive of the water, or 300 lbs/yd$^3$ of concrete (177 kg/m$^3$) to 1,100 lbs/yd$^3$ of concrete (650 kg/m$^3$) of concrete. The water-to-cement ratio by weight is usually approximately 0.25 to approximately 0.7. Relatively low water-to-cement materials ratios by weight lead to higher strength but lower workability, while relatively high water-to-cement materials ratios by weight lead to lower strength, but better workability. Aggregate usually comprises 70% to 80% by volume of the concrete. However, the relative amounts of cementitious material to aggregate to water are not a critical feature of the present invention; conventional amounts can be used. Nevertheless, sufficient cementitious material should be used to produce concrete with an ultimate compressive strength of at least 1,000 psi, preferably at least 2,000 psi, more preferably at least 3,000 psi, most preferably at least 4,000 psi, especially up to about 10,000 psi or more.

In particular, Ultra High Performance concrete, concrete panels or concrete elements with compressive strengths of over 20,000 psi can be cast and cured using the method of the present invention.

The aggregate used in the concrete used with the present invention is not critical and can be any aggregate typically used in concrete. The aggregate that is used in the concrete depends on the application and/or the strength of the concrete desired. Such aggregate includes, but is not limited to, fine aggregate, medium aggregate, coarse aggregate, sand, gravel, crushed stone, lightweight aggregate, recycled aggregate, such as from construction, demolition and excavation waste, and mixtures and combinations thereof.

The reinforcement of the concrete used with the present invention is not a critical aspect of the present invention and thus any type of reinforcement required by design requirements can be used. Such types of concrete reinforcement include, but are not limited to, deformed steel bars, cables, post tensioned cables, pre-stressed cables, fibers, steel fibers, mineral fibers, synthetic fibers, carbon fibers, steel wire fibers, mesh, lath, and the like.

The preferred cementitious material for use with the present invention comprises portland cement; preferably portland cement and one of slag cement or fly ash; and more preferably portland cement, slag cement and fly ash. Slag cement is also known as ground granulated blast-furnace slag (GGBFS). The cementitious material preferably comprises a reduced amount of or no portland cement and increased amounts of recycled supplementary cementitious materials; e.g., slag cement, fly ash, energetically modified cement and/or volcanic ash. This results in cementitious material and concrete that is more environmentally friendly. The portland cement can also be replaced, in whole or in part, by one or more cementitious materials other than portland cement, slag cement or fly ash. Such other cementitious or pozzolanic materials include, but are not limited to, silica fume; metakaolin; rice hull (or rice husk) ash; ground burnt clay bricks; brick dust; bone ash; animal blood; clay; volcanic ash, energetically modified cement, other siliceous, aluminous or aluminosiliceous materials that react with calcium hydroxide in the presence of water; hydroxide-containing compounds, such as sodium hydroxide, magnesium hydroxide, or any other compound having reactive hydrogen groups, other hydraulic cements, other pozzolanic materials and combinations thereof. The portland cement can also be replaced, in whole or in part, by one or more inert or filler materials other than portland cement, slag cement or fly ash. Such other inert or filler materials include, but are not limited to limestone powder; calcium carbonate; titanium dioxide; quartz; or other finely divided minerals that densify the hydrated cement paste.

The preferred cementitious material for use with a disclosed embodiment of the present invention comprises 0% to approximately 100% by weight portland cement. The range of 0% to approximately 100% by weight portland cement includes all of the intermediate percentages; such as, 5%, 10%, 15%, 20%, 25%, 30%, 35%, 40%, 45%, 50%, 55%, 60%, 65%, 70%, 75%, 80%, 85%, 90% and 95%. The cementitious material of the present invention can also comprise 0% to approximately 90% by weight portland cement, preferably 0% to approximately 80% by weight portland cement, preferably 0% to approximately 70% by weight portland cement, more preferably 0% to approximately 60% by weight portland cement, most preferably 0% to approximately 50% by weight portland cement, especially 0% to approximately 40% by weight portland cement, more especially 0% to approximately 30% by weight portland cement, most especially 0% to approximately 20% by weight portland cement, or 0% to approximately 10% by weight portland cement. In one disclosed embodiment, the cementitious material comprises approximately 10% to approximately 45% by weight portland cement, more preferably approximately 10% to approximately 40% by weight portland cement, most preferably approximately 10% to approximately 35% by weight portland cement, especially approximately 33⅓% by weight portland cement, most especially approximately 10% to approximately 30% by weight portland cement. In another disclosed embodiment of the present invention, the cementitious material can comprise approximately 5% by weight portland cement, approximately 10% by weight portland cement, approximately 15% by weight portland cement, approximately 20% by weight portland cement, approximately 25% by weight portland cement, approximately 30% by weight portland cement, approximately 35% by weight portland cement, approximately 40% by weight portland cement, approximately 45% by weight portland cement or approximately 50% by weight portland cement or any sub-combination thereof.

The preferred cementitious material for use in one disclosed embodiment of the present invention also comprises 0% to approximately 90% by weight slag cement, preferably approximately 10% to approximately 90% by weight slag cement, preferably approximately 20% to approximately 90% by weight slag cement, more preferably approximately 30% to approximately 80% by weight slag cement, most preferably approximately 30% to approximately 70% by weight slag cement, especially approximately 30% to approximately 60% by weight slag cement, more especially approximately 30% to approximately 50% by weight slag cement, most especially approximately 30% to approximately 40% by weight slag cement. In another disclosed embodiment the cementitious material comprises approximately 33⅓% by weight slag cement. In another disclosed embodiment of the present invention, the cementitious material can comprise approximately 5% by weight slag cement, approximately 10% by weight slag cement, approximately 15% by weight slag cement, approximately 20% by weight slag cement, approximately 25% by weight slag cement, approximately 30% by weight slag cement, approximately 35% by weight slag cement, approximately 40% by weight slag cement, approximately 45% by weight slag cement, approximately 50% by weight slag cement, approximately 55% by weight slag cement, approximately 60% by weight slag cement, approximately 65%, approximately 70% by weight slag cement, approximately 75% by weight slag cement, approximately 80% by weight slag cement, approximately 85% by weight slag cement or approximately 90% by weight slag cement or any sub-combination thereof.

The preferred cementitious material for use in one disclosed embodiment of the present invention also comprises 0% to approximately 80% by weight fly ash, preferably approximately 10% to approximately 80% by weight fly ash, preferably approximately 10% to approximately 75% by weight fly ash, preferably approximately 10% to approximately 70% by weight fly ash, preferably approximately 10% to approximately 65% by weight fly ash, preferably approximately 10% to approximately 60% by weight fly ash, preferably approximately 10% to approximately 55% by weight fly ash, preferably approximately 10% to approximately 80% by weight fly ash, preferably approximately 10% to approximately 45% by weight fly ash, more preferably approximately 10% to approximately 40% by weight fly ash, most preferably approximately 10% to approximately 35% by weight fly ash, especially approximately 33⅓% by weight fly ash. In another disclosed embodiment of the present invention, the preferred cementitious material comprises 0% by weight fly ash, approximately 5% by weight fly ash, approximately 10% by weight fly ash, approximately 15% by weight fly ash, approximately 20% by weight fly ash, approximately 25% by weight fly ash, approximately 30% by weight fly ash, approximately 35% by weight fly ash, approximately 40% by weight fly ash, approximately 45% by weight fly ash or approximately 80% by weight fly ash, approximately 55% by weight fly ash, approximately 60% by weight fly ash, approximately 65% by weight fly ash, approximately 70% by weight fly ash or approximately 75% by weight fly ash, approximately 80% by weight fly ash or any sub-combination thereof. Preferably the fly ash has an average particle size of <10 μm; more preferably 90% or more of the particles have a particles size of <10 μm.

The cementitious material for use in one disclosed embodiment of the present invention can optionally include 0.1% to approximately 10% by weight Wollastonite. Wollastonite is a calcium inosilicate mineral ($CaSiO_3$) that may contain small amounts of iron, magnesium, and manganese substituted for calcium. In addition the cementitious material can optionally include 0.1-25% calcium oxide (quick lime), calcium hydroxide (hydrated lime), calcium carbonate or latex or polymer admixtures, either mineral or synthetic, that have reactive hydroxyl groups.

The cementitious material for use in one disclosed embodiment of the present invention can also optionally include inert fillers, such as limestone powder; calcium carbonate; titanium dioxide; quartz; or other finely divided minerals that densify the hydrated cement paste. Specifically, inert fillers optionally can be used in the cementitious material of the present invention in amounts of 0% to approximately 40% by weight; preferably, approximately 5% to approximately 30% by weight. In one disclosed embodiment, the cementitious material for use with the present invention comprises 0% to approximately 100% by weight portland cement, approximately 10% to approximately 90% by weight slag cement, approximately 5% to approximately 80% by weight fly ash and 0% to approximately 40% by weight inert filler. In another disclosed embodiment, the cementitious material for use with the present invention comprises approximately 10% to approximately 100% by weight portland cement; at least one of approximately 10% to approximately 90% by weight slag cement and approximately 5% to approximately 80% by weight fly ash; and 5% to approximately 40% by weight inert filler.

In one disclosed embodiment, the preferred cementitious material for use with the present invention comprises approximately equal parts by weight of portland cement, slag cement and fly ash; i.e., approximately 33⅓% by weight portland cement, approximately 33⅓% by weight slag cement and approximately 33⅓% by weight fly ash. In another disclosed embodiment, a preferred cementitious material for use with the present invention has a weight ratio of portland cement to slag cement to fly ash of 1:1:1. In another disclosed embodiment, the preferred cementitious material for use with the present invention has a weight ratio of portland cement to slag cement to fly ash of approximately 0.85-1.15:0.85-1.15:0.85-1.15, preferably approximately 0.9-1.1:0.9-1.1:0.9-1.1, more preferably approximately 0.95-1.05:0.95-1.05:0.95-1.05.

In one disclosed embodiment, the cementitious material for use with the present invention comprises approximately 10% to approximately 100% by weight Portland cement, approximately 10% to approximately 90% by weight slag cement, and approximately 5% to approximately 80% by weight fly ash. In one disclosed embodiment, the cementitious material for use with the present invention comprises approximately 10% to approximately 80% by weight Portland cement, approximately 10% to approximately 90% by weight slag cement, and approximately 5% to approximately 80% by weight fly ash. In another disclosed embodiment, the cementitious material for use with the present invention comprises approximately 10% to approximately 70% by weight Portland cement, approximately 10% to approximately 90% by weight slag cement, and approximately 5% to approximately 80% by weight fly ash. In another disclosed embodiment, the cementitious material for use with the present invention comprises approximately 10% to approximately 60% by weight Portland cement, approximately 10% to approximately 90% by weight slag cement, and approximately 5% to approximately 80% by weight fly ash. In another disclosed embodiment, the cementitious material for use with the present invention comprises approximately 10% to approximately 50% by weight Portland cement, approximately 10% to approximately 90% by weight slag cement, and approximately 5% to approximately 80% by weight fly ash. In another disclosed embodiment, the cementitious material for use with the present invention comprises less than 50% by weight Portland cement, approximately 10% to approximately 90% by weight slag cement, and approximately 5% to approximately 80% by weight fly ash. In another disclosed embodiment, the cementitious material for use with the present invention comprises approximately 10% to approximately 45% by weight Portland cement, approximately 10% to approximately 90% by weight slag cement, and approximately 5% to approximately 80% by weight fly ash. In another disclosed embodiment, the cementitious material for use with the present invention comprises approximately 10% to approximately 40% by weight Portland cement, approximately 10% to approximately 90% by weight slag cement, and approximately 5% to approximately 80% by weight fly ash. In another disclosed embodiment, the cementitious material for use with the present invention comprises approximately 10% to approximately 35% by weight Portland cement, approximately 10% to approximately 90% by weight slag cement, and approximately 5% to approximately 80% by weight fly ash.

In one disclosed embodiment, the cementitious material for use with the present invention comprises 0% to approximately 100% by weight Portland cement, approximately 10% to approximately 90% by weight slag cement, and approximately 5% to approximately 80% by weight fly ash. In one disclosed embodiment, the cementitious material for use with the present invention comprises 0% to approximately 80% by weight Portland cement, approximately 10% to approximately 90% by weight slag cement, and approximately 5% to approximately 80% by weight fly ash. In another disclosed embodiment, the cementitious material for use with the present invention comprises 0% to approximately 70% by weight Portland cement, approximately 10% to approximately 90% by weight slag cement, and approximately 5% to approximately 80% by weight fly ash. In another disclosed embodiment, the cementitious material for use with the present invention comprises 0% to approximately 60% by weight Portland cement, approximately 10% to approximately 90% by weight slag cement, and approximately 5% to approximately 80% by weight fly ash. In another disclosed embodiment, the cementitious material for use with the present invention comprises 0% to approximately 50% by weight Portland cement, approximately 10% to approximately 90% by weight slag cement, and approximately 5% to approximately 80% by weight fly ash. In another disclosed embodiment, the cementitious material for use with the present invention comprises 0% to approximately 45% by weight Portland cement, approximately 10% to approximately 90% by weight slag cement, and approximately 5% to approximately 80% by weight fly ash. In another disclosed embodiment, the cementitious material for use with the present invention comprises 0% to approximately 40% by weight Portland cement, approximately 10% to approximately 90% by weight slag cement, and approximately 5% to approximately 80% by weight fly ash. In another disclosed embodiment, the cementitious material for use with the present invention comprises 0% to approximately 35% by weight Portland cement, approximately 10% to approximately 90% by weight slag cement, and approximately 5% to approximately 80% by weight fly ash.

In another disclosed embodiment, the cementitious material for use with the present invention comprises approximately 10% to approximately 100% by weight Portland cement and at least one of approximately 10% to approximately 90% by weight slag cement and approximately 5% to approximately 80% by weight fly ash. In another disclosed embodiment, the cementitious material for use with the present invention comprises approximately 10% to approximately 90% by weight Portland cement and at least one of approximately 10% to approximately 90% by weight slag cement and approximately 5% to approximately 80% by weight fly ash. In another disclosed embodiment, the cementitious material for use with the present invention comprises approximately 10% to approximately 80% by weight Portland cement and at least one of approximately 10% to approximately 90% by weight slag cement and approximately 5% to approximately 80% by weight fly ash. In another disclosed embodiment, the cementitious material for use with the present invention comprises approximately 10% to approximately 70% by weight Portland cement and at least one of approximately 10% to approximately 90% by weight slag cement and approximately 5% to approximately 80% by weight fly ash. In another disclosed embodiment, the cementitious material for use with the present invention comprises approximately 10% to approximately 60% by weight Portland cement and at least one of approximately 10% to approximately 90% by weight slag cement and approximately 5% to approximately 80% by weight fly ash. In another disclosed embodiment, the cementitious material for use with the present invention comprises approximately 10% to approximately 50% by weight Portland cement and at least one of approximately 10% to approximately 90% by weight slag cement and approximately 5% to approximately 80% by weight fly ash. In another disclosed embodiment, the cementitious material for use with the present invention comprises approximately 10% to approximately 40% by weight Portland cement and at least one of approximately 10% to approximately 90% by weight slag cement and approximately 5% to approximately 80% by weight fly ash.

In another disclosed embodiment, the cementitious material for use with the present invention comprises approximately 10% to approximately 90% by weight Portland cement; approximately 10% to approximately 90% by weight slag cement; 0% to approximately 80% by weight fly ash; 0% to 10% by weight Wollastonite; and 0% to approximately 25% by weight calcium oxide, calcium hydroxide, or latex or polymer admixtures, either mineral or synthetic, that have reactive hydroxyl groups, or mixtures thereof. In one disclosed embodiment, the cementitious material for use with the present invention comprises approximately 10% to approximately 80% by weight Portland cement; approximately 10% to approximately 90% by weight slag cement; 0% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 70% by weight Portland cement; approximately 10% to approximately 90% by weight slag cement; 0% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 60% by weight Portland cement; approximately 10% to approximately 90% by weight slag cement; 0% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 50% by weight Portland cement; approximately 10% to approximately 90% by weight slag cement; 0% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises less than 50% by weight Portland cement; approximately 10% to approximately 90% by weight slag cement; approximately 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 45% by weight Portland cement; approximately 10% to approximately 90% by weight slag cement; 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 40% by weight Portland cement; approximately 10% to approximately 90% by weight slag cement; approximately 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 35% by weight Portland cement; approximately 10% to approximately 90% by weight slag cement; approximately 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof.

In another disclosed embodiment, the cementitious material for use with the present invention comprises at least one of approximately 10% to approximately 100% by weight Portland cement, approximately 10% to approximately 90% by weight slag cement or approximately 5% to approximately 80% by weight fly ash; 0% to 10% by weight Wollastonite; and 0% to approximately 25% by weight calcium oxide, calcium hydroxide, or latex or polymer admixtures, either mineral or synthetic, that have reactive hydroxyl groups, or mixtures thereof. In one disclosed embodiment, the cementitious material for use with the present invention comprises at least one of approximately 10% to approximately 80% by weight Portland cement, approximately 10% to approximately 90% by weight slag cement or approximately 5% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 70% by weight Portland cement, approximately 10% to approximately 90% by weight slag cement or approximately 5% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 60% by weight Portland cement, approximately 10% to approximately 90% by weight slag cement or approximately 5% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 50% by weight Portland cement, approximately 10% to approximately 90% by weight slag cement or approximately 5% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises less than 50% by weight Portland cement; approximately 10% to approximately 90% by weight slag cement; approximately 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 45% by weight Portland cement, approximately 10% to approximately 90% by weight slag cement or approximately 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 40% by weight Portland cement, approximately 10% to approximately 90% by weight slag cement or approximately 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 35% by weight Portland cement, approximately 10% to approximately 90% by weight slag cement or approximately 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof.

In another disclosed embodiment, the cementitious material for use with the present invention comprises approximately 10% to approximately 90% by weight Portland cement; at least one of approximately 10% to approximately 90% by weight slag cement or approximately 5% to approximately 80% by weight fly ash; and 0.1% to 10% by weight Wollastonite. In one disclosed embodiment, the cementitious material for use with the present invention comprises approximately 10% to approximately 80% by weight Portland cement; at least one of approximately 10% to approximately 90% by weight slag cement or approximately 5% to approximately 80% by weight fly ash; and 0.1% to approximately 10% by weight Wollastonite. In another disclosed embodiment, the cementitious material for use with the present invention comprises approximately 10% to approximately 70% by weight Portland cement; at least one of approximately 10% to approximately 90% by weight slag cement or approximately 5% to approximately 80% by weight fly ash; and 0.1% to approximately 10% by weight Wollastonite. In another disclosed embodiment, the cementitious material for use with the present invention comprises approximately 10% to approximately 60% by weight Portland cement; at least one of approximately 10% to approximately 90% by weight slag cement or approximately 5% to approximately 80% by weight fly ash; and 0.1% to approximately 10% by weight Wollastonite. In another disclosed embodiment, the cementitious material for use with the present invention comprises approximately 10% to approximately 50% by weight Portland cement; at least one of approximately 10% to approximately 90% by weight slag cement or approximately 5% to approximately 80% by weight fly ash; and 0.1% to approximately 10% by weight Wollastonite. In another disclosed embodiment, the cementitious material for use with the present invention comprises less than 50% by weight Portland cement; at least one of approximately 10% to approximately 90% by weight slag cement or approximately 5% to approximately 80% by weight fly ash; and 0.1% to approximately 10% by weight Wollastonite. In another disclosed embodiment, the cementitious material for use with the present invention comprises approximately 10% to approximately 45% by weight Portland cement; at least one of approximately 10% to approximately 90% by weight slag cement or approximately 5% to approximately 80% by weight fly ash; and 0.1% to approximately 10% by weight Wollastonite. In another disclosed embodiment, the cementitious material for use with the present invention comprises approximately 10% to approximately 40% by weight Portland cement; at least one of approximately 10% to approximately 90% by weight slag cement or approximately 5% to approximately 80% by weight fly ash; and 0.1% to approximately 10% by weight Wollastonite. In another disclosed embodiment, the cementitious material for use with the present invention comprises approximately 10% to approximately 35% by weight Portland cement; at least one of approximately 10% to approximately 90% by weight slag cement or approximately 5% to approximately 80% by weight fly ash; and 0.1% to approximately 10% by weight Wollastonite.

The portland cement, slag cement and fly ash can be combined physically or mechanically in any suitable manner and is not a critical feature. For example, the portland cement, slag cement and fly ash can be mixed together to form a uniform blend of dry material prior to combining with the aggregate and water. Or, the portland cement, slag cement and fly ash can be added separately to a conventional concrete mixer, such as the transit mixer of a ready-mix concrete truck, at a batch plant. The water and aggregate can be added to the mixer before the cementitious material, however, it is preferable to add the cementitious material first, the water second, the aggregate third and any makeup water last.

Chemical admixtures can also be used with the preferred concrete for use with the present invention. Such chemical admixtures include, but are not limited to, accelerators, retarders, air entrainments, plasticizers, superplasticizers, coloring pigments, corrosion inhibitors, bonding agents and pumping aid. Although chemical admixtures can be used with the concrete of the present invention, it is believed that chemical admixtures are not necessary.

Mineral admixtures or supplementary cementitious materials (SCMs) can also be used with the concrete of the present invention. Such mineral admixtures include, but are not limited to, silica fume; metakaolin; rice hull (or rice husk) ash; ground burnt clay bricks; brick dust; bone ash; animal blood; clay; other siliceous, aluminous or alumino-siliceous materials that react with calcium hydroxide in the presence of water; hydroxide-containing compounds, such as sodium hydroxide, magnesium hydroxide, or any other compound having reactive hydrogen groups, other hydraulic cements and other pozzolanic materials. Although mineral admixtures can be used with the concrete of the present invention, it is believed that mineral admixtures are not necessary.

The concrete mix cured in an insulated concrete form in accordance with the present invention, produces concrete with superior early strength and ultimate strength properties compared to the same concrete mix cured in a conventional form without the use of any chemical additives to accelerate or otherwise alter the curing process. Thus, in one disclosed embodiment of the present invention, the preferred cementitious material comprises at least two of portland cement, slag cement and fly ash in amounts such that at three to seven days the concrete mix cured in accordance with the present invention has a compressive strength at least 50% greater than the same concrete mix would have after the same amount of time in a conventional (i.e., non-insulated) concrete form under ambient conditions. In another disclosed embodiment, the preferred concrete mix cured in accordance with the present invention has a compressive strength at least 25%, at least 50%, at least 75%, at least 100%, at least 150%, at least 200%, at least 250% or at least 300% greater than the same concrete mix would have after the same amount of time in a conventional (i.e., non-insulated) concrete form under the same conditions.

In another disclosed embodiment of the present invention, the preferred cementitious material comprises portland cement, slag cement and fly ash in amounts such that at three to seven days the concrete mix cured in accordance with the present invention has a compressive strength at least 25% or at least 50% greater than the same concrete mix would have after three days in a conventional concrete form under ambient conditions. In another disclosed embodiment the preferred concrete mix cured in accordance with the present invention has a compressive strength at least 25%, at least 50%, at least 75%, at least 100%, at least 150%, at least 200%, at least 250% or at least 300% greater than the same concrete mix would have after the same amount of time in a conventional (i.e., non-insulated) concrete form under the same conditions.

In another disclosed embodiment of the present invention, the preferred cementitious material comprises portland cement and slag cement in amounts such that at three to seven days the concrete mix cured in accordance with the present invention has a compressive strength at least 25% or at least 50% greater than the same concrete mix would have after the same time period in a conventional concrete form under ambient conditions. In another disclosed embodiment, the preferred concrete mix cured in accordance with the present invention has a compressive strength at least 100%, at least 150%, at least 200%, at least 250% or at least 300% greater than the same concrete mix would have after the same amount of time in a conventional (i.e., non-insulated) concrete form under the same conditions.

In another disclosed embodiment of the present invention, the preferred cementitious material comprises portland cement and fly ash in amounts such that at three to three to seven days the concrete mix cured in accordance with the present invention has a compressive strength at least 25% or at least 50% greater than the same concrete mix would have after the same time period in a conventional concrete form under ambient conditions. In another disclosed embodiment the preferred concrete mix cured in accordance with the present invention has a compressive strength at least 100%, at least 150%, at least 200%, at least 250% or at least 300% greater than the same concrete mix would have after the same amount of time in a conventional (i.e., non-insulated) concrete form under the same conditions.

The present invention can be used to form any type of concrete structure or object, either cast in place or precast. The present invention can be used to form footings, retaining walls, exterior walls of buildings, load-bearing interior walls, columns, piers, parking deck slabs, elevated slabs, roofs, bridges, or any other structures or objects. Also, the present invention can be used to form precast structures or objects, tilt-up concrete panels for exterior walls of buildings, load-bearing interior walls, columns, piers, parking deck slabs, elevated slab, roofs and other similar precast structures and objects. Additionally, the present invention can be used to form precast structures including, but not limited to, walls, floors, decking, beams, railings, pipes, vaults, underwater infrastructure, modular paving products, retaining walls, storm water management products, culverts, bridge systems, railroad ties, traffic barriers, tunnel segments, light pole beams, light pole bases, transformer pads, and the like.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A concrete casting table comprising:
a first horizontal concrete forming panel having a first primary surface adapted for forming and contacting plastic concrete and a second primary surface opposite the first primary surface, wherein the first concrete forming panel defines a plane;
a second horizontal panel having a first primary surface and a second primary surface opposite the first primary surface;
a first continuous layer of insulating material continuously contacting the second primary surface of the first concrete forming panel and the second primary surface of the second panel, the layer of insulating material substantially covering the second primary surface of the first panel;
a plurality of vertical side members, each of which has a first primary surface adapted for forming plastic concrete and a second primary surface opposite the first primary surface, wherein the first horizontal concrete forming panel and the plurality of vertical side members define a concrete mold cavity;
a second continuous layer of insulating material substantially covering the second primary surface of each of the plurality of vertical side members;
a removable third layer of insulating material covering the concrete mold cavity, and
a frame disposed on the first primary surface of the second panel, the frame comprising a plurality of bracing members oriented transversely with respect to the first primary surface of the second panel, wherein no portion of the frame is in the plane defined by the first concrete forming panel.

2. The concrete casting table of claim 1, wherein the first and second continuous layers of insulating material each comprise a conductive heat insulating material or a radiant heat reflective material.

3. The concrete casting table of claim 1, wherein the first and second continuous layers of insulating material each have insulating properties equivalent to at least 0.25 inch of polystyrene foam.

4. The concrete casting table of claim 1, wherein the first and second continuous layers of insulating material each have insulating properties equivalent to at least 0.5 inch of polystyrene foam.

5. The concrete casting table of claim 1, wherein the first and second continuous layers of insulating material each have insulating properties equivalent to at least 1 inch of polystyrene foam.

6. The concrete casting table of claim 1, wherein the first and second continuous layers of insulating material each have insulating properties equivalent to at least 2 inches of polystyrene foam.

7. The concrete casting table of claim 1, wherein the first and second continuous layers of insulating material each comprises a layer of refractory insulating material in an adhesive.

8. The concrete casting table of claim 1, wherein the first and second continuous layers of insulating material each comprises a layer of ceramic fibers in an adhesive.

9. The concrete casting table of claim 8, wherein the adhesive is polyurethane or epoxy.

10. The concrete casting table of claim 1, wherein the first and second continuous layers of insulating material each comprises Wollastonite in an adhesive.

11. The concrete casting table of claim 1, wherein the first and second continuous layers of insulating material each comprises closed cell polymeric foam.

12. The concrete casting table of claim 1, wherein the first and second continuous layers of insulating material each comprise a rigid insulating polymeric foam.

13. The concrete casting table of claim 1, wherein the first and second continuous layers of insulating material each comprise a polymeric foam of polyvinyl chloride, urethane, polyurethane, polyisocyanurate, phenol, polyethylene, polyimide or expanded polystyrene.

14. The concrete casting table of claim 1, wherein the removable third layer of insulating material has insulating properties equivalent to at least 1 inch of polystyrene foam.

15. The concrete casting table of claim 1, wherein the removable third layer of insulating material has insulating properties equivalent to at least 2 inch of polystyrene foam.

16. The concrete casting table of claim 1, wherein the removable third layer of insulating material comprises a polymeric foam of polyvinyl chloride, urethane, polyurethane, polyisocyanurate, phenol, polyethylene, polyimide or expanded polystyrene.

17. The concrete casting table of claim 14, wherein the removable third layer of insulating material comprises a polymeric foam of polyvinyl chloride, urethane, polyurethane, polyisocyanurate, phenol, polyethylene, polyimide or expanded polystyrene.

18. The concrete form of claim 15, wherein the removable third layer of insulating material comprises a polymeric foam of polyvinyl chloride, urethane, polyurethane, polyisocyanurate, phenol, polyethylene, polyimide or expanded polystyrene.

19. The concrete form of claim 6, wherein the removable third layer of insulating material has insulating properties equivalent to at least 2 inch of polystyrene foam.

* * * * *